(12) United States Patent
Kabasawa

(10) Patent No.: US 6,288,868 B1
(45) Date of Patent: Sep. 11, 2001

(54) RECORDING MEDIUM DRIVING APPARATUS

(75) Inventor: Hidetoshi Kabasawa, Saitama-Ken (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/205,983

(22) Filed: Dec. 4, 1998

(30) Foreign Application Priority Data

Dec. 5, 1997 (JP) .................................................. 9-335998
Dec. 5, 1997 (JP) .................................................. 9-335999

(51) Int. Cl.$^7$ .................................................. G11B 5/00
(52) U.S. Cl. .................................................. 360/99.06
(58) Field of Search .................... 360/97.01, 97.02, 360/99.04, 99.06, 99.08; 369/75.2

(56) References Cited

U.S. PATENT DOCUMENTS

| | | | |
|---|---|---|---|
| 5,187,622 | 2/1993 | Watanabe | 360/99.02 |
| 5,222,005 | * 6/1993 | Inoue | 360/99.06 |
| 5,508,857 | * 4/1996 | Horita | 360/75 |
| 5,889,638 | * 3/1999 | Kabasawa et al. | 360/106 |
| 5,956,206 | 9/1999 | Kabasawa et al. | 360/99.06 |
| 5,956,214 | * 9/1999 | Shinozaki et al. | 360/105 |

* cited by examiner

*Primary Examiner*—William Klimowicz
*Assistant Examiner*—Chin Tupe
(74) *Attorney, Agent, or Firm*—Anderson, Kill & Olick, P.C.

(57) ABSTRACT

A recording medium driving apparatus includes a holder into which a cartridge having a recording medium is inserted, a head part, and a cartridge contact preventing mechanism preventing an end of the cartridge from contacting the head part when the cartridge is inserted into the recording medium driving apparatus.

9 Claims, 19 Drawing Sheets

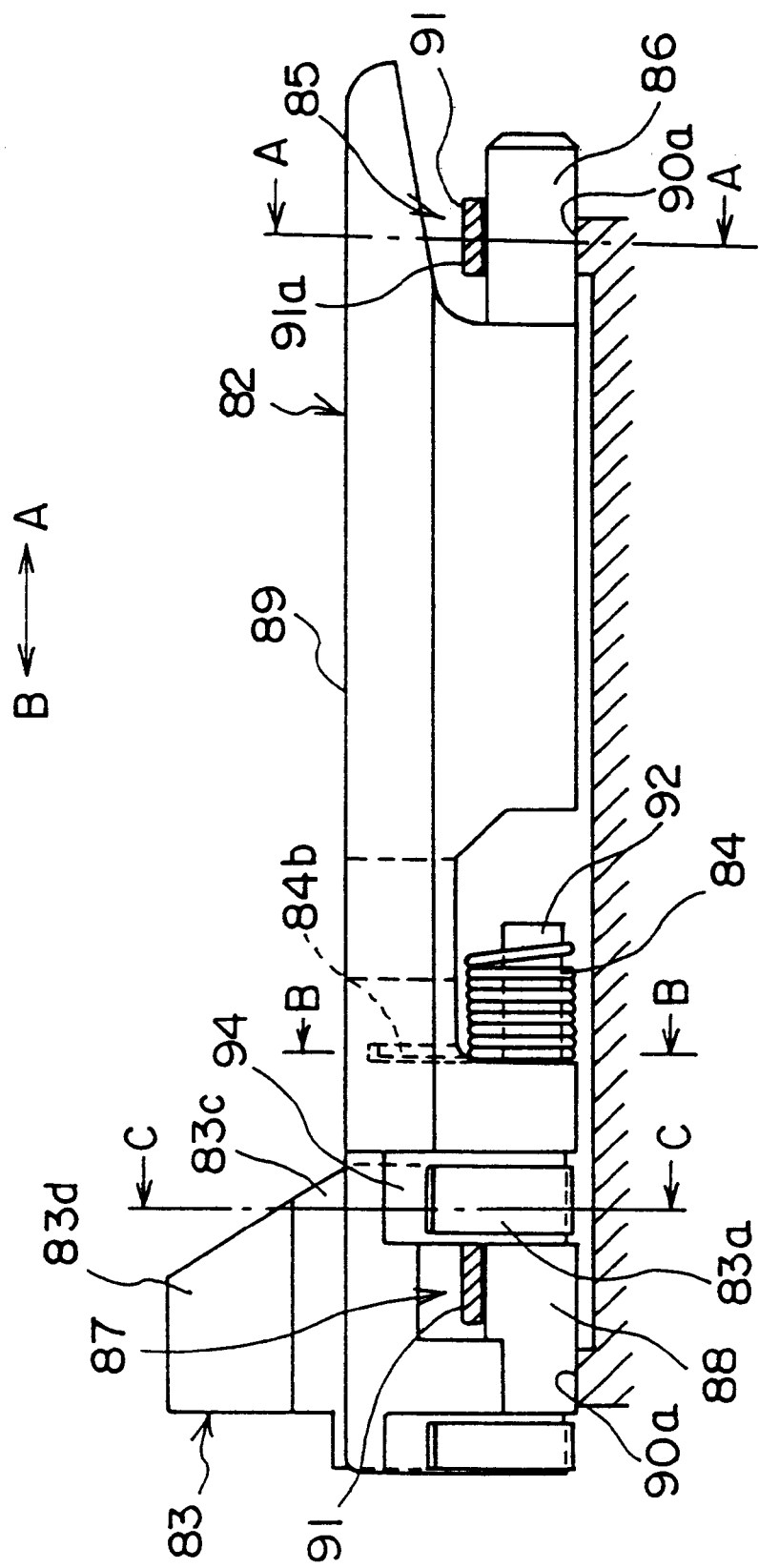

(RECORDING / REPRODUCING STATE)

(EJECT MODE)

( STANDBY STATE IN RECORDING / REPRODUCING STATE )

( RECORDING / REPRODUCING MODE )

FIG. 18A  (EJECT MODE)
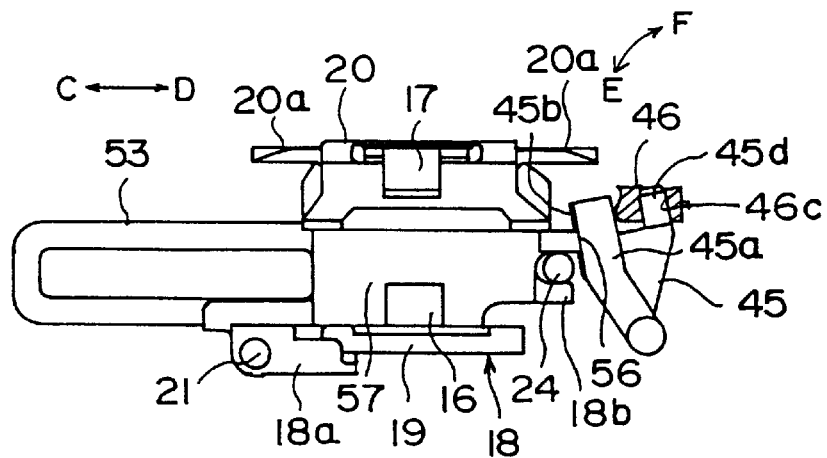
FIG. 18B  (STANDBY MODE)
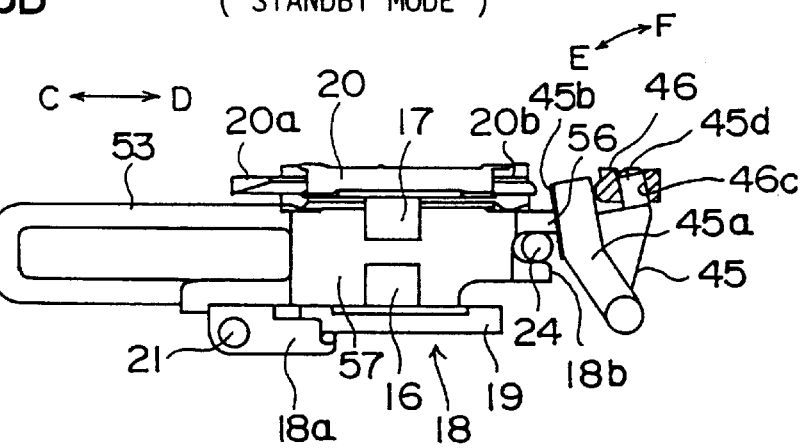
FIG. 18C  (RECORDING / REPRODUCING MODE)
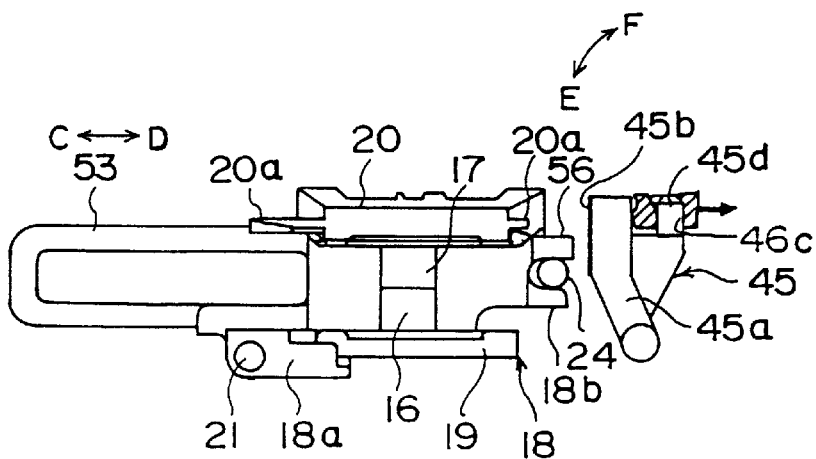

FIG. 19A  (EJECT MODE)
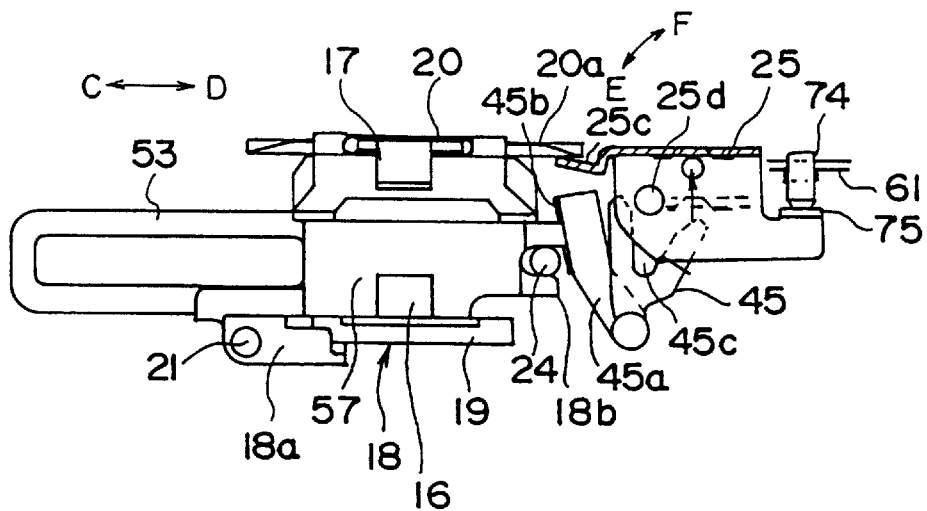
FIG. 19B  (STANDBY MODE)
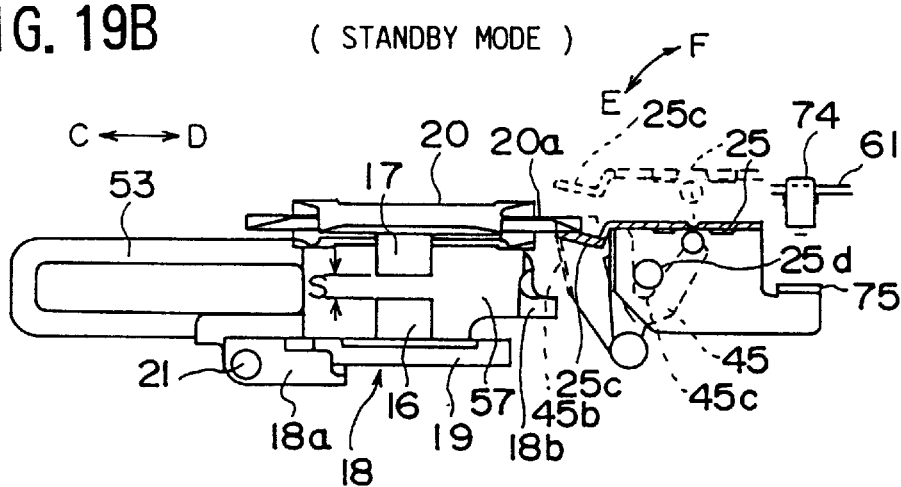
FIG. 19C  (RECORDING / REPRODUCING MODE)
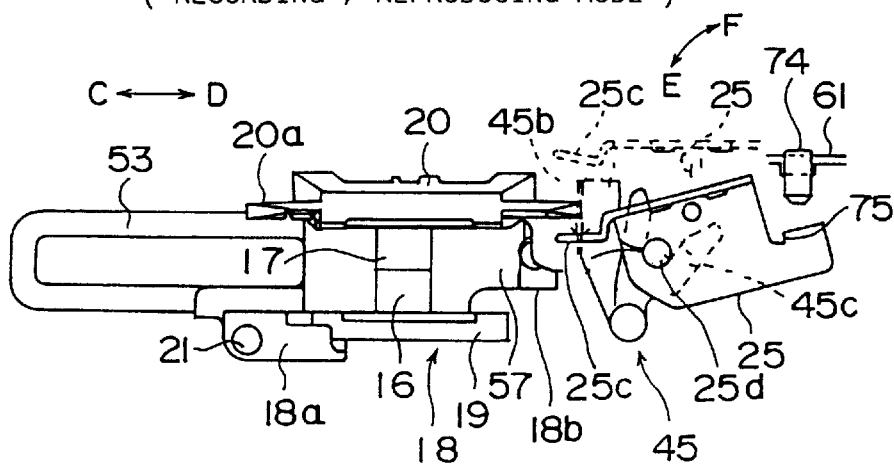

(DISK INSERT / EJECT STATE)
PROTECT FUNCTION VALID SECTION (RECORDING / REPRODUCING STATE)

RECORDING MEDIUM DRIVING APPARATUS

BACKGROUND OF THE INVENTION

1. Field of the Invention

The present invention generally relates to recording medium driving apparatuses, and more particularly a disk drive which performs a recording and/or reproducing operation on a disk-shaped magnetic recording medium housed in a disk cartridge.

2. Description of the Related Art

A magnetic disk drive detachably accommodates a disk cartridge housing a flexible magnetic disk. Such a magnetic disk drive is required to have a reduced thickness and a reduced size. A finer production is required to assemble such a compact magnetic disk drive.

A reduced thickness of the magnetic disk drive results in a narrower gap between the insertion height of the disk cartridge inserted into a holder and the height of a lower magnetic head supported by a head carriage. When the disk cartridge is warped so that a deformed projection faces downward, the front end of the disk cartridge inserted in the holder may contact with the lower magnetic head.

Japanese Patent Publication No. 6-103573 discloses a disk cartridge contact preventing mechanism which prevents the front end of the disk cartridge from coming into contact with the lower magnetic head when the disk cartridge is inserted into the holder. The contact preventing mechanism includes a protruding part, a contact preventing member and a rotary lever. The protruding part is provided to the upper surface of a frame. The contact preventing member restricts the disk cartridge inserting position so that the disk cartridge rides over the protruding part when the disk cartridge is inserted into the holder in order to prevent the end of the disk cartridge from coming into contact with the lower magnetic head. The rotary lever has an end joined to the contact preventing member, and another end joined to a slider having an ejection button.

When the disk cartridge is inserted into the holder, the holder moves down from the disk cartridge inserting position. Further, the slider slides and the rotary lever is thus rotated. Hence, the rotary lever moves the contact preventing member to a contact preventing position or a refuge position in which the contact preventing member is spaced away from the disk cartridge.

Recently, there has been considerable activity in increasing the recording capacity of the magnetic disk by increasing the revolution of the disk and thus recording information thereon at an increased density. Such a large-capacity magnetic disk drive, a floating force caused by an air flow generated by high-speed rotation of the magnetic disk is applied to the magnetic head. Hence, the magnetic head flies above the disk and is maintained so that it is slightly spaced apart from the disk. Hence, the magnetic head is prevented from damaging the disk surface.

When the magnetic disk drive is equipped with the above-mentioned disk cartridge contact preventing mechanism, the magnetic disk drive is required to have a space in which the mechanism is installed. Further, it is required to provide, on the upper surface of the frame, the contact preventing member and the rotary lever of the contact preventing mechanism in order to transfer the sliding operation of the slider to the contact preventing member via the rotary lever. Hence, the rotary lever limits the shape of the contact preventing member and the range of the rotary operation. In addition, the assembly work is troublesome because the contact preventing mechanism is assembled by a large number of parts.

SUMMARY OF THE INVENTION

It is an object of the present invention to provide a recording medium driving apparatus in which the above-mentioned disadvantages are eliminated.

A more specific object of the present invention is to provide a recording medium driving apparatus equipped with a simple and compact head cartridge contact preventing mechanism.

The above objects of the present invention are achieved by A recording medium driving apparatus comprising: a holder into which a cartridge having a recording medium is inserted; a head part; and a cartridge contact preventing mechanism preventing an end of the cartridge from contacting the head part when the cartridge is inserted into the recording medium driving apparatus.

The recording medium driving apparatus may be configured so that the cartridge contact preventing mechanism comprises: a first part which contacts the cartridge immediately before the cartridge reaches the head part to limit a height position of the cartridge so that the head part can be prevented from contacting the cartridge.

The recording medium driving apparatus may be configured so that the cartridge contact preventing mechanism comprises: a second part which moves the first part to a limit releasing position after the end of the cartridge passes the head part.

The recording medium driving apparatus may be configured so that the second part contacts the cartridge after the end of the cartridge passes the head part.

The recording medium driving apparatus may be configured so that: the head part comprises two heads opposite each other; and the cartridge contact preventing mechanism has a part which defines a given between the cartridge and one of the two heads.

The recording medium driving apparatus may be configured by further comprising: a deformation preventing mechanism which prevents the holder in a given insert/eject position from being deformed.

The recording medium driving apparatus may be configured so that the deformation preventing mechanism comprises a part which engages a given part of the cartridge contact preventing mechanism.

The recording medium driving apparatus may be configured so that the given part of the cartridge contact preventing mechanism is urged in a direction opposite to another direction in which a load is exerted onto the holder.

The above objects of the present invention are also achieved by a recording medium driving apparatus comprising: a holder into which a cartridge having a recording medium is inserted; a head part; and a deformation preventing mechanism which prevents the holder in a given insert/eject position from being deformed.

BRIEF DESCRIPTION OF THE DRAWINGS

Other objects, features and advantages of the present invention will become apparent from the following detailed description when read in conjunction with the accompanying drawings, in which:

FIG. 8 is a side view illustrating how the protector is attached;

FIGS. 18A, 18B and 18C are front views illustrating an operation of a carriage stopper with respect to the head carriage;

FIGS. 19A, 19B and 19C are front views illustrating operations of the carriage stopper and a lifter with respect to the head arm.

DESCRIPTION OF THE PREFERRED EMBODIMENTS

A description will now be given, with reference to the accompanying drawings, of a magnetic disk drive according to an embodiment of the present invention.

Figure 1:
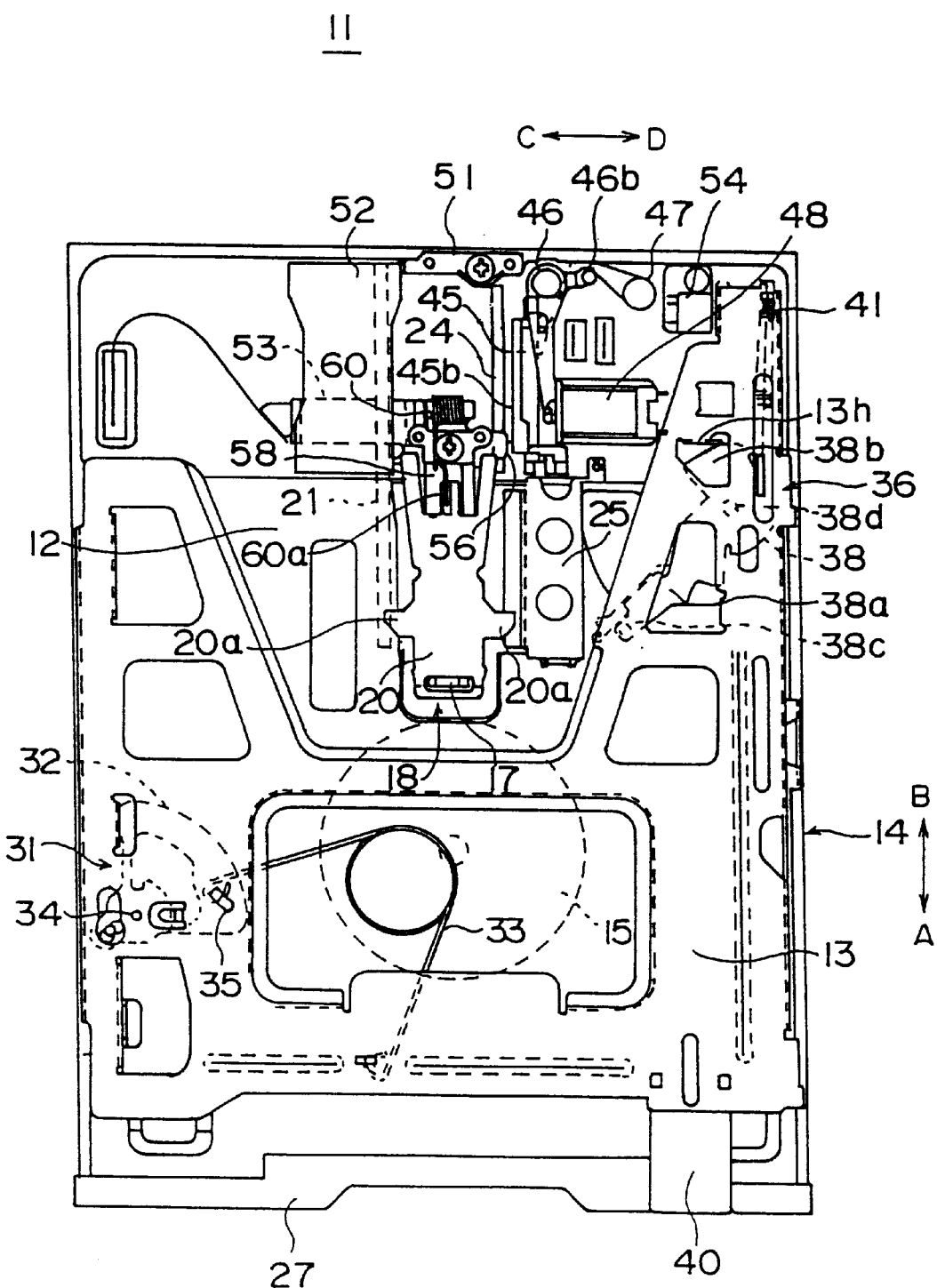
FIG. 1 is a plan view of a magnetic disk drive which is a first embodiment of a recording medium driving apparatus of the present invention.
Figure 2:
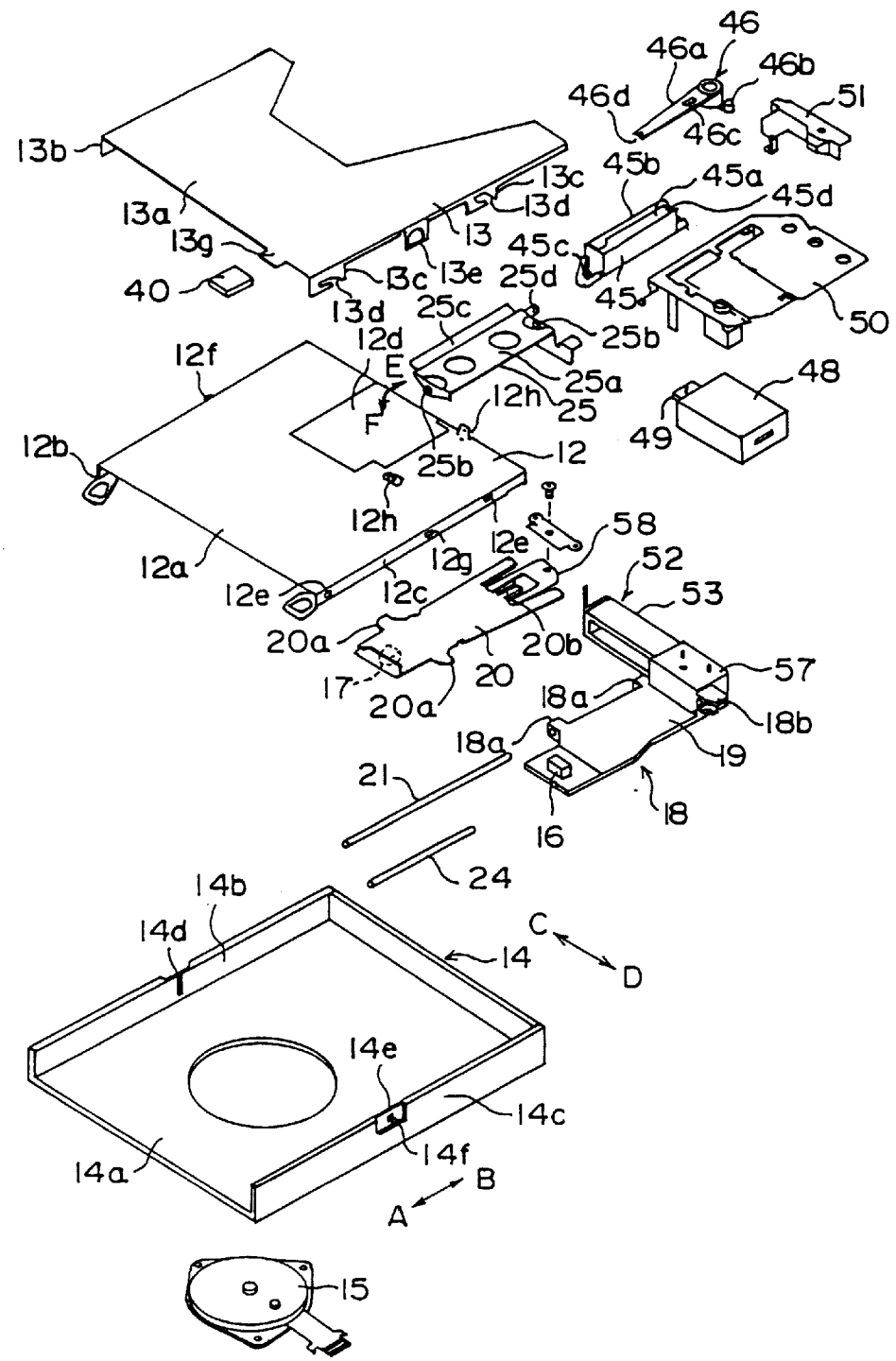
FIG. 2 is an exploded perspective view of the magnetic disk drive shown in FIG. 1.

FIG. 1 is a plan view of a magnetic disk drive 11, and FIG. 2 is a schematic perspective view thereof Referring to FIGS. 1 and 2, the magnetic disk drive 11 includes a disk holder 12 into which a disk cartridge (not shown) having a flexible magnetic disk can be inserted, and a slider 13 that slides forward and backward so that the disk holder 12 is moved up and down. The disk holder 12 and the slider 13 are mounted on a frame 14. The slider 13 is provided so that it is free to move on the frame in directions A and B. When the slider 13 slides in the direction A, the holder 12 is moved down to a cartridge loading position from a cartridge insert/eject position.

On a flat surface 14a of the frame 14, provided are a turn table 15 driven by a motor for rotating the disk, and a head carriage 18 which supports magnetic heads 16 and 17. A circuit board (not shown) having a control circuit is attached to a lower surface of the frame 14.

The head carriage 18 has a carriage main body 19, and a head arm 20. The carriage main body 19 supports the lower magnetic head 16 on an upper end surface thereof, and supports the upper magnetic head 17 on a lower end surface. The head carriage 18 is movably attached to guide shafts 21 and 24 extending in the front and back directions (directions A and B). Shaft receiving parts 18a and 18b are provided in left and right side surfaces of the head carriage 18. The guide shafts 21 and 24 are slidably fit into the shaft receiving parts 18a and 18b.

The shaft receiving parts 18a has a circular hole into which the main guide shaft 21 penetrates, and defines the movement direction and the position in the left, right and height directions. The shaft receiving part 18b has an approximately C-shaped structure into which the guide shaft 21 is fit, and defines the position in the height direction only.

The head carriage 18 is guided by the guide shafts 21 and 24 by driving force created by a voice coil motor 52 (which will be described later), and is thus moved in the directions A and B. Hence, the magnetic heads 16 and 17 supported by the head carriage 18 are caused to position on desired tracks on the magnetic disk (not shown) housed in the disk cartridge. Hence, information can be recorded on or reproduced from the magnetic disk.

A damper mechanism 31 is provided to the lower surface of the slider 13. More particularly, a shaft 34 and an engagement part 35 are provided to the lower surface of the slider 13. The shaft 34 rotatably supports a damper plate 32 of the damper mechanism 31. The engagement part 35 holds an end of a torsion spring 33. The damper mechanism 31 is not an oil damper but a mechanism damper which utilizes a spring force and decelerates the sliding operation of the slider 13. That is, the damper mechanism 31 includes the damper plate 32 and the torsion spring 33, which urges the damper plate 32.

The damper mechanism 31 urges the slider 13 in the direction (direction B) reverse to the movement direction of the slider 13 at the initial stage of the movement of the disk holder 12 from the cartridge insert/eject position to the cartridge loading position. The damper mechanism 31 urges the slider in the movement direction (direction A) when the damper plate 32 rotates over a given rotation while the slider 13 is sliding. Thus, at the time of loading the disk, the damper mechanism 31 decelerates the slider 13 due to the spring force of the torsion spring 33, and reduces the descending speed of the disk holder 12, that is, the disk loading speed.

A more detailed description will now be given of essential parts of the magnetic disk drive.

The disk holder 12 includes a top plate 12a and cartridge guide parts 12b and 12c, which are bent so as to old the disk cartridge from both sides of the top plate 2a. The space defined by the top plate 12a and the cartridge guide parts 12b and 12c functions as a cartridge inserting part.

An opening 12d through which the head carriage 18 moves is formed in the top plate 12a of the disk holder 12. A lifter 25 is slidably attached to the right side of the opening 12d. The lifter 25 contacts protruding parts 20a, which protrude from both sides of the head arm 20. Hence, the head arm 20 intermittently ascends or descends the magnetic head 17 in accordance with the up and down movement of the disk holder 12. The disk holder 12, the head arm 20 and the lifter 25 form a head movement mechanism.

The lifter 25 is supported by supporting parts 12h which stands upright on the top plate 12a of the disk holder 12 and engage a shaft 25b protruding from both sides of a main body 25a. Hence, the lifter 25 can be rotated in directions E and F orthogonal to the carriage movement directions (directions A and B).

A pair of engagement pins 12e which engages the slider 13 is provided on one side of the disk holder 12, and another pair of engagement pins 12e which engages the slider is provided on the opposing side of the disk holder 12. Guide parts 12f and 12g are respectively provided to the central part of the opposing sides of the disk holder 12. The guide parts 12f and 12g fit into guide grooves 14d and 14e provided to side walls 14b and 14c of the frame 14, and guide the up and down movements of the disk holder 12.

The lifter 25 provided to the top plate 12a of the disk holder 12 rotates in response to the up and down movements of the disk holder 12 so that an engagement part 25c comes into contact with the protruding part 20a of the head arm 20 and thus descends the head arm 20 in stepwise fashion. The engagement part 25c has a length corresponding to the range from the innermost track position on the disk to the outermost track position, that is, the stroke of the head carriage 18.

The slider 13 is slidably attached to the upper part of the disk holder 12, and is made up of a flat plate 13a, side surfaces 13b and 13c and slant grooves 13d, and engagement holes 13e. The side surfaces 13b and 13c are formed so that two opposing sides of the flat plate 13a are bent downward. The engagement pins 12e of the disk holder 12 engage with the slant grooves 13d formed on the side surfaces 13b and 13c. Protruding parts 14f that protrude from the central parts of the opposing side surfaces of the frame 14 engage the engagement holes 13e. The slider 13 had a projection piece 13g, which is located on the right side of the front end and protrudes therefrom forward. An eject button 40 is fixed to the projection piece 13g. The slider 13 is urged in the direction A by a coil spring 41.

Figure 3:
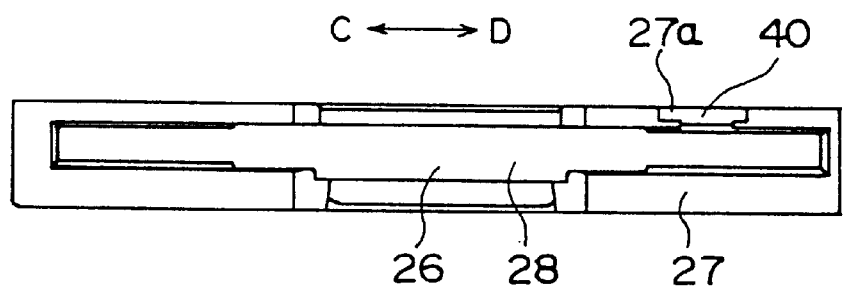
FIG. 3 is a front view of the magnetic disk drive.

FIG. 3 is a front view of the magnetic disk drive. A front vessel 27 having a disk inlet 26 is attached to the front end of the frame 14. A recess part 27a, which slidably engages the eject button 40, is provided to the upper right part of the front vessel 27. A flap 28 is rotatably provided to the backside of the front vessel 27 so that the flap 28 opens and closes the disk inlet 26 on the inner side of the frame 14.

Figure 4:
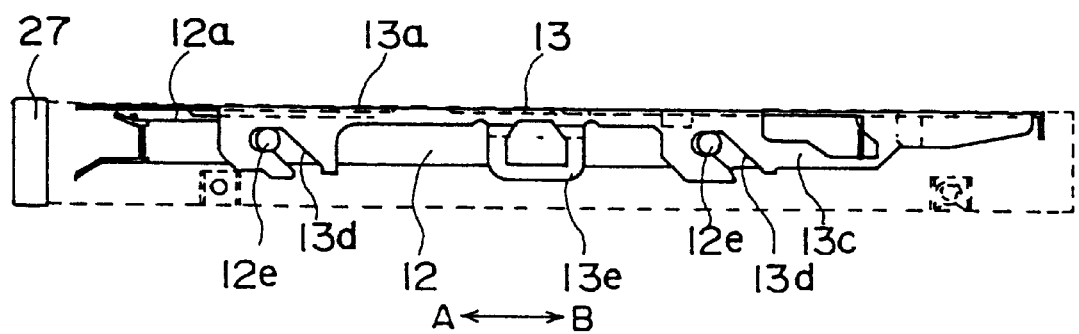
FIG. 4 is a side view showing a state in which a disk holder and a head carriage are combined.

FIG. 4 is a side view of a state in which the disk holder 12 and the slider 13 are combined. Referring to FIG. 4, the engagement pins 12e engage the slant grooves 13d of the slider 13, and are moved along the slant grooves 13d when the slider 13 slides. When the slider 13 slides in the direction B, the disk holder 12 is moved up to the cartridge insert/eject position. When the slider 13 slides in the direction A, the disk holder 12 is moved down to the cartridge loading position. The disk holder 12 and the slider 13 form a disk transfer mechanism.

Turning to FIG. 1 again, there is provided a latch mechanism 36, which includes a latch lever 38 and a coil spring 41. The latch lever 38 is rotatably provided on the upper surface of the disk holder 12. The coil spring 41 urges the latch lever 38 in the counterclockwise direction. The coil spring 41 also functions to a slider return spring which urges the slider 13 in the direction A and a latch lever return spring which urges the latch lever 38.

The latch lever 38 includes a lever part 38a and an arc-shaped engagement part 38b. The latch lever 38 opens and closes a shutter (not shown) of the disk cartridge. The engagement part 38b engages an engaged part 13h of the slider 13. When the disk cartridge is inserted into the disk holder 12, the latch lever 38 is pressed against the front end of the disk cartridge and is rotated clockwise. When the arc-shaped engagement part 38b is detached from the engaged part 13h of the slider 13, the slider urged by the coil spring 41 is caused to slide in the direction A.

When the latch lever 38 is rotated as described above, an end 38c of the lever part 38a pushes the shutter of the disk cartridge in the opening direction, so that the magnetic heads 16 and 17 contact the magnetic disk. When the eject button 40 is pushed in the direction B and the slider 13 is caused to slide in the direction B, the engagement of the engagement part 38b with the engaged part 13h of the slider 13 is released. Hence, the latch lever 38 is counterclockwise rotated due to the spring force of the coil spring 41.

A carriage stopper 45 is a lock member, which engages the head carriage 18 when the disk cartridge is ejected. Hence, the magnetic heads 16 and 17 are prevented from contacting the magnetic disk (not shown). The carriage stopper 45 is attached so that it extends in the directions A and B with a main body 45 thereof facing the right side of the guide shaft 24. The carriage stopper 45 is supported by a shaft receiving part (not shown) formed on the frame 14 so that it can rotate in the directions E and F as in the case of the lifter 25. The carriage stopper 45 has a rack 45b and a V-shaped recess part 45c. The rack 45b engages the head carriage 18. The engagement pin 25d extending from the end of the lifter 25 engages the V-shaped recess part 45c.

A movable rack 56 facing the rack 45b is provided to the right-side surface of the head carriage 18. The rack 45b has a length corresponding to the range from the innermost track position on the disk to the outermost track position, that is, the stroke of the head carriage 18. Hence, when the carriage stopper 45 is rotated in the direction E, the rack 45b engages the movable rack 56 so that the head carriage 18 is locked.

A stopper joint lever 46 is rotatably supported by a shaft 44 provided on the frame 14, and includes an arm part 46a and a spring engagement part 46b. The arm part 46a extends in the direction A. The spring engagement part 46b extends in the direction approximately orthogonal to the direction A. An oval slit 46c is formed in the root part of the arm 46a. A protruding pin 45d protruding from the upper rear part of the main body 45a of the carriage stopper 45 engages the oval engagement slit 46c.

An end 47a of a torsion spring 47 is engaged with the spring engagement part 46b of the stopper joint lever 46, and the other end 47b thereof contacts the inner wall of the rear part of the frame 14. Thus, the stopper joint lever 46 is urged by the spring force of the torsion spring 47 in the clockwise direction, that is, the carriage engagement direction.

A solenoid 48 is excited by an instruction from a control circuit (not shown) and absorbs a plunger 49 in the direction D. An end of the plunger 49 is joined to the end of the arm part 46a of the stopper joint lever 46. Hence, the stopper joint lever 46 is rotated in the counterclockwise direction, namely, the carriage disengagement direction, when the solenoid 48 is excited and the plunger 49 is thus absorbed in the direction D.

If the solenoid 48 is not excited due to a service interruption or the like, the plunger 49 is returned in the direction C, and the stopper joint lever 46 is rotated in the clockwise direction, that is, the carriage engagement direction.

A hold member 50 is formed of a sheet metal, and presses the guide shaft 24, the stopper joint lever 46, the solenoid 48 and the torsion spring 47 from the upper sides thereof when the hold member 50 is attached to the frame 14.

A guide shaft pressing member 51 is fixed to the frame 14 in a state in which end of the guide shaft 21 is pressed in the direction D orthogonal to the axial direction.

The voice coil motor 52 includes a coil 53, which is integrally attached to the left side surface of the head carriage 18. The voice coil motor 52 is positioned at the left side of the guide shaft 21 arranged in the vicinity of the center of gravity of the head carriage 18. The head carriage 18 is driven in the directions A and B by the voice coil motor 52, so that the seek operation on the magnetic heads 16 and 17 can be performed. As compared to an arrangement in which a pair of voice coil motors is arranged at both sides of the head carriage, the head carriage 18 has a compact size and a narrow space for movement of the carriage 18. This contributes to downsizing of the magnetic disk drive 11.

A description will now be given of peripheral structures of the head carriage 18.

Figure 5:
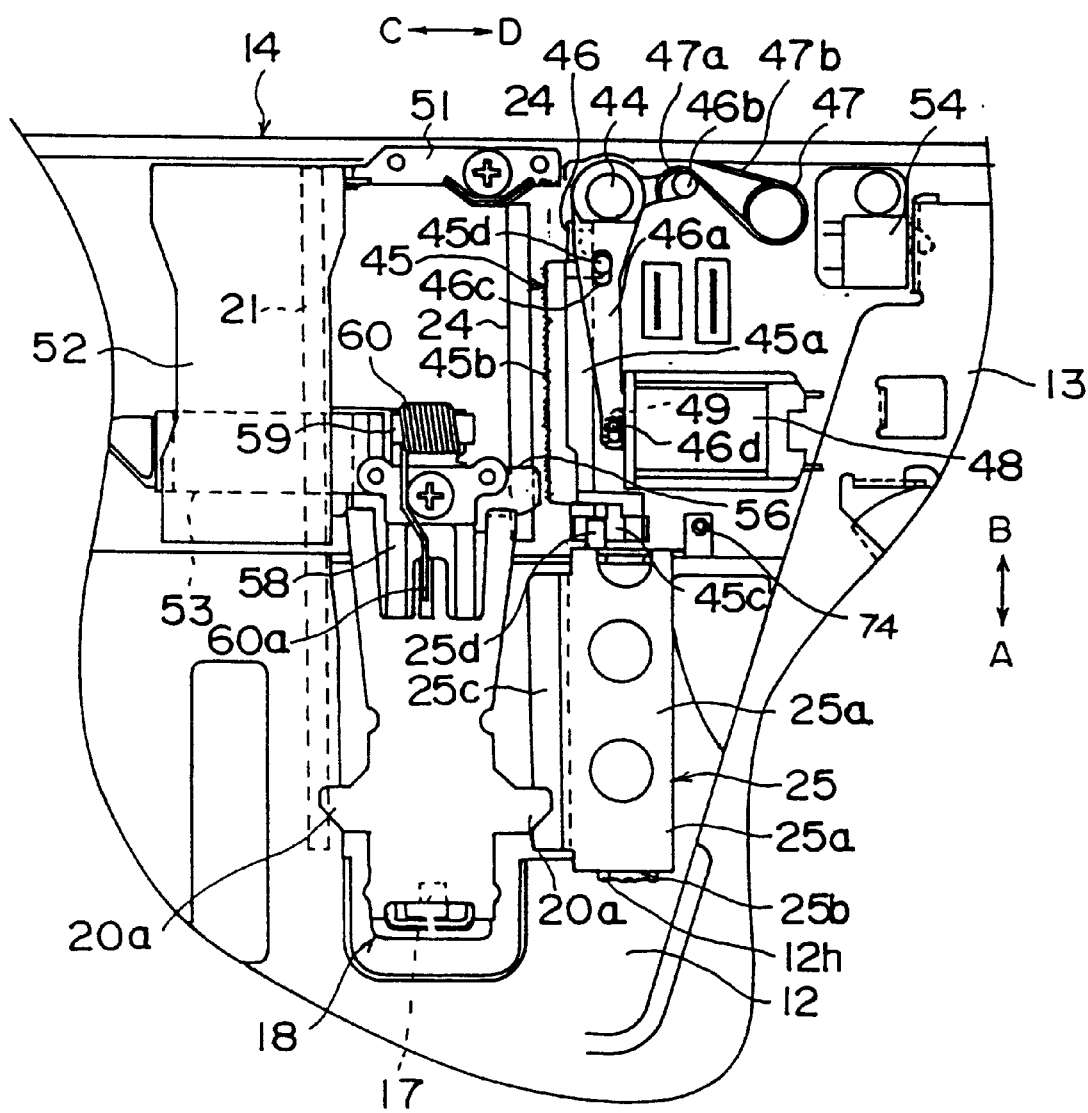
FIG. 5 is an enlarged plan view of a peripheral part of a head carriage observed in a recording/reproducing mode.

FIG. 5 is an enlarged plan view of a peripheral part of the head carriage 18 observed in a recording/reproducing mode. As shown in FIG. 5, the head arm 20 is supported to a supporting stage via a leaf spring 58 so that it can rotate in the up and down directions. The head arm 20 is urged downward by a pressing part 60a extending from a torsion spring 60 in the direction A. The torsion spring 60 is wound around a shaft 59 provided in the rear part of the supporting stage 57.

Hence, the protruding part 20a protruding downward from the head arm 20 is pressed against the upper surface of the engagement part 25c of the lifter 25. The lifter 25 is intermittently rotated in response to the rotation of the carriage stopper 45 as will be described in detail later, since the engagement pin 25b protruding from the end part of the lifter 25 engages the V-shaped recess part 45c provided in the end part of the carriage stopper 45.

The plunger 49 absorbed by the solenoid 48 engages a tip end 46d of the arm part 46a of the stopper joint lever 46. The spring engagement part 46b of the stopper joint lever 46 is urged in the clockwise direction due to the spring force of the torsion spring 47. Hence, the carriage stopper 45 formed so that the projection pin 45 engages the engagement slit 46c of the stopper joint lever 46 is rotated in the carriage engagement direction (direction E) due to the spring force of the torsion spring 47. Hence, the rack 45b of the carriage stopper 45 engages the movable rack 56 of the head carriage 18, which is thus locked.

An eject detection switch 54, which detects an event such that the slider 13 slides in the ejecting direction, is provided to the rear part of the frame 14. The eject detection switch 54 is pushed against the end of the slider 13, which is caused to slide when the eject button 40 is pushed in the direction B, and is thus switched to the closed state.

Figure 6:
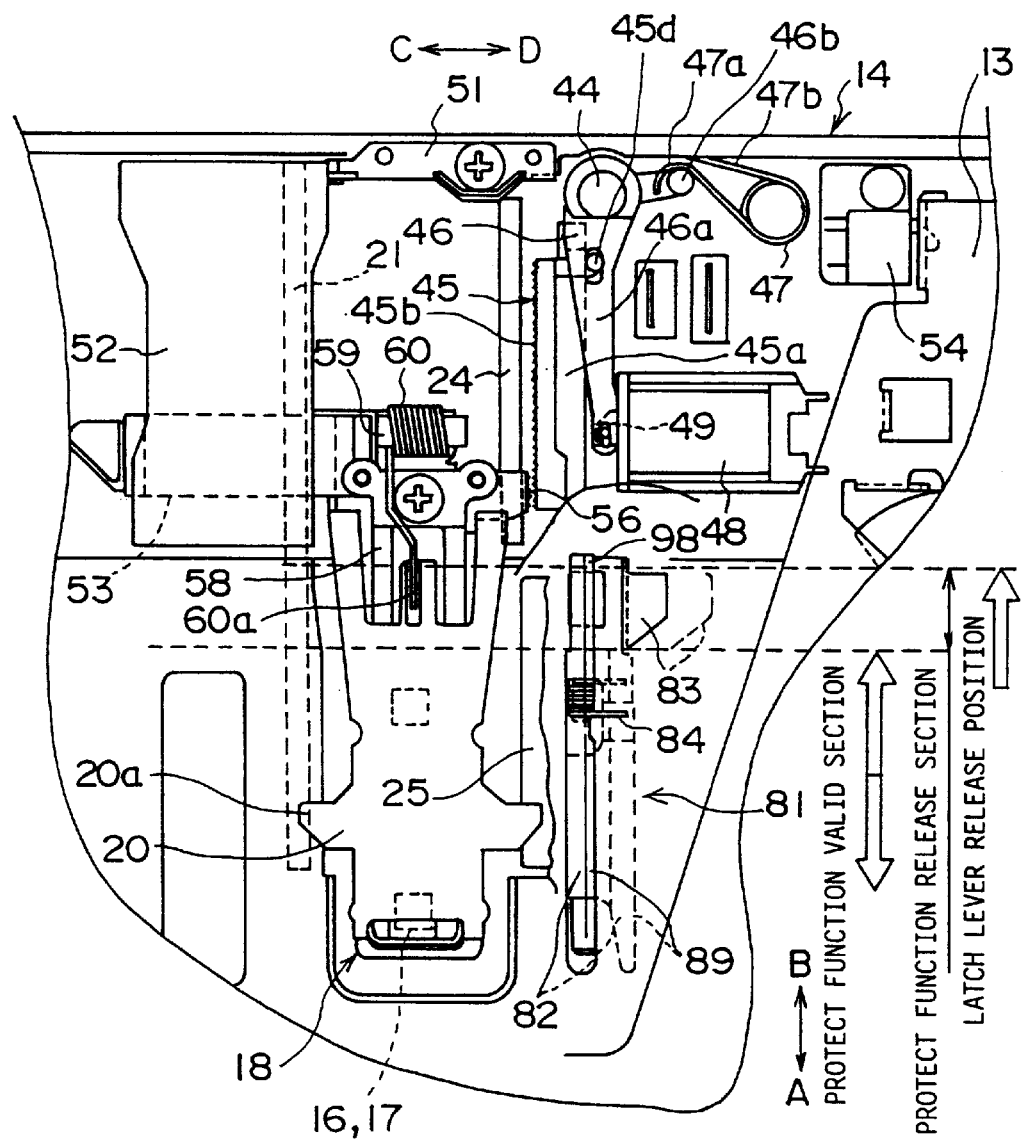
FIG. 6 is a plan view of a disk cartridge contact preventing mechanism used in the first embodiment of the present invention.
Figure 7A:
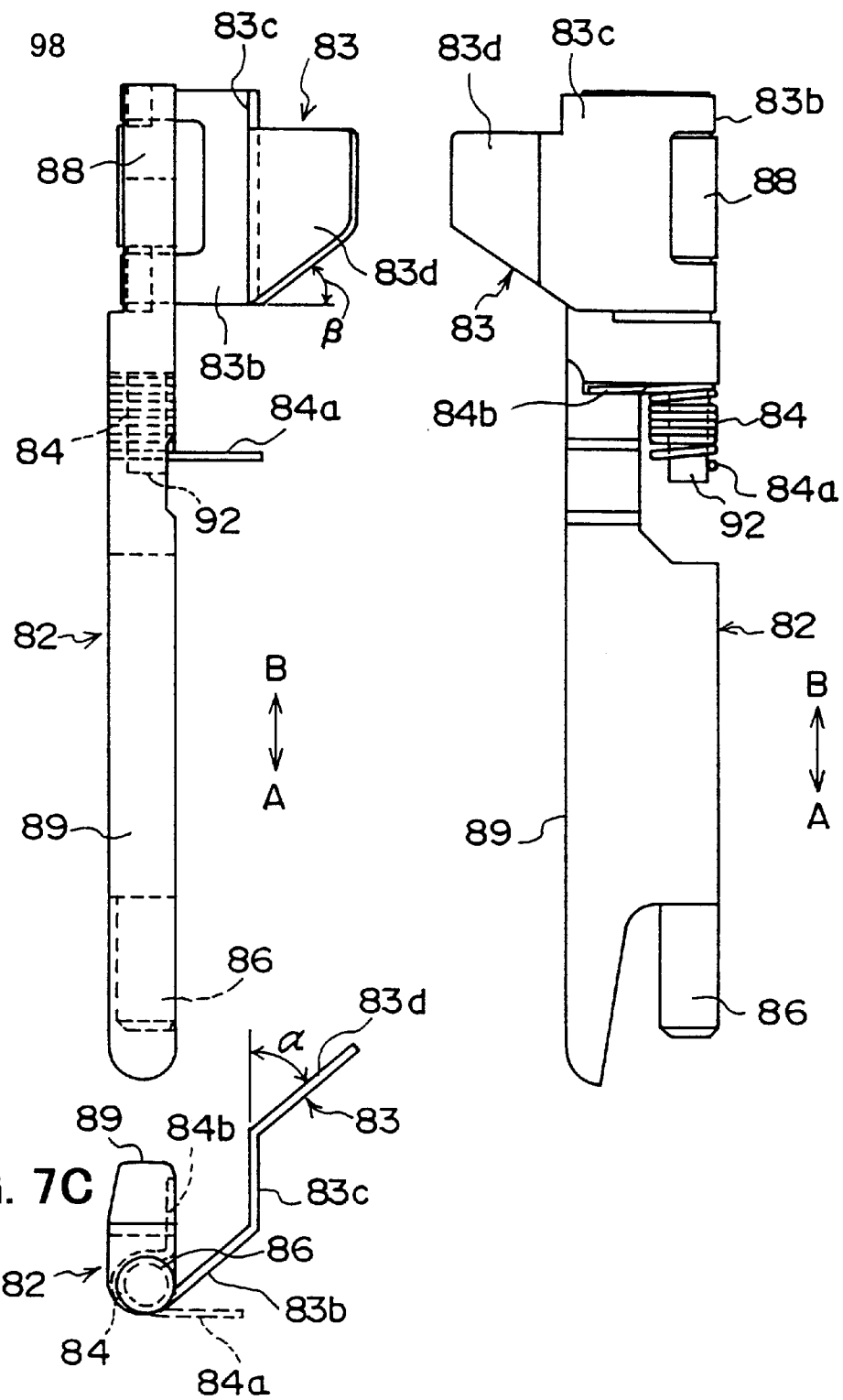
FIGS. 7A, 7B and 7C are diagrams of a protector of the disk cartridge contact preventing mechanism.
Figure 7B:
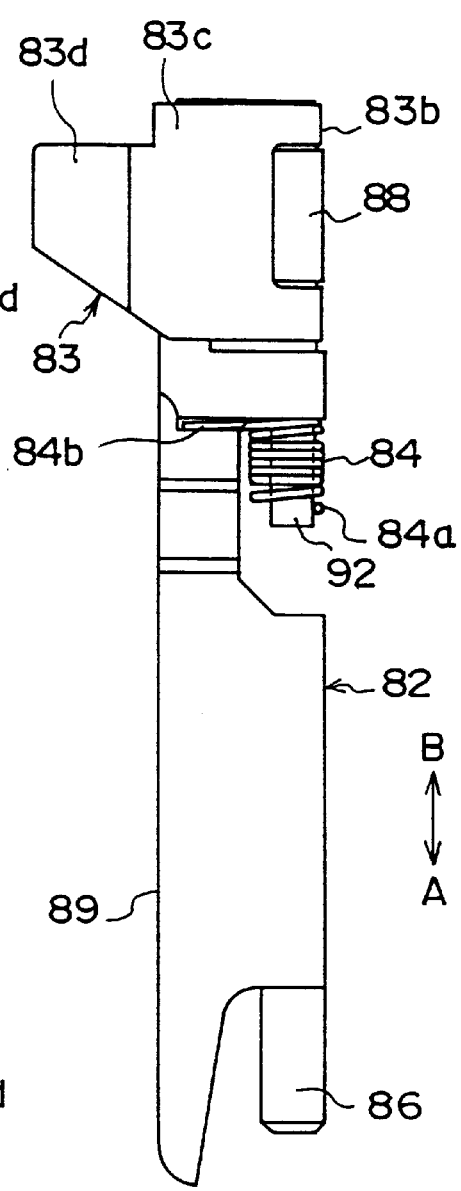
Figure 7C:
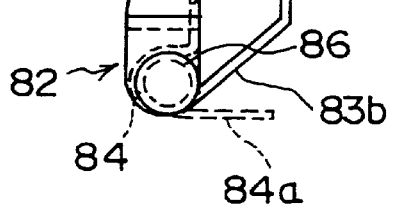

FIG. 6 is a plan view of a disk cartridge contact preventing mechanism 81 provided in the magnetic disk drive 11. The mechanism 81 has a protector 82 as shown in FIGS. 7A through 7C. The protector 82 is attached as shown in FIG. 8.

The disk cartridge contact preventing mechanism 81 is arranged in an area on the frame 14 located at the right side of the head carriage 18. The mechanism 81 restricts the insertion height position of the disk cartridge so that the leading end of the disk cartridge in the inserting operation can be prevented from contacting the lower magnetic head 16 when the disk cartridge is inserted into the disk holder 12.

The disk cartridge contact preventing mechanism 81 includes a protector (disk cartridge limiting part) 82, a protector arm (limit releasing part) 83, and a torsion spring 84. The protector 82 extends in the direction in which the disk cartridge is inserted. The protector arm 83 is attached to a rear end part of the protector 82. The torsion spring 84 urges the protector 82 so that it stands upright. In FIG. 6, the protector 82 that stands upright before the disk cartridge is inserted is indicated by a solid line, and the protector 82 that is rotated after the disk cartridge is inserted is indicated by a broken line.

The protector 82 is made up of a first shaft 86, a second shaft 88, and a disk cartridge sliding part 89. The first shaft 86 is supported by a first bearing 85 provided on the frame 14. The second shaft 88 is supported by a second bearing 87 provided on the frame 14. The disk cartridge sliding part 89 extends in the radial direction from the first shaft 86 and the second shaft 88.

As shown in FIG. 6, an area of the protector 82 in which the disk cartridge sliding part 89 is provided is a protecting function valid section in which the insertion height position of the disk cartridge is limited. Another area of the protector 82 in which the protector arm 83 extends sideward is a protecting function release section in which the limitation on the insertion height position of the disk cartridge is released. The end of the protecting function releasing section is a latch lever releasing position, which will be described later.

The limitation on the insertion height position is released when the protector arm 83 is pushed by the disk cartridge and is moved to the refuge position. Hence, a reduced number of parts can be provided to the frame 14 and can be attached thereto by simple and efficient work.

Figure 9:
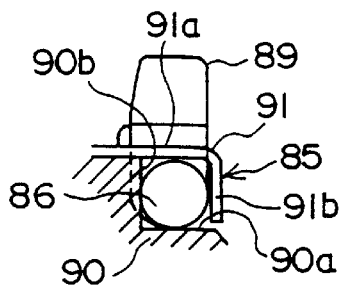
FIG. 9 is a sectional view that is taken along line A—A shown in FIG. 8 and illustrates a second bearing part.

FIG. 9 is a sectional-view taken along line A—A shown in FIG. 8. The first bearing 85 includes a step art 90, and a pressing plate 91. The first shaft 86 is supported by the first bearing 85 so that the first shaft 86 contacts the first bearing 85 at two contact points. The pressing plate 91 presses the first shaft 86 from the upper and side thereof. The first shaft 86 is rotatably supported at four points so that the first shaft 86 contacts a horizontal surface 90a of the step part 90, a vertical surface 90b thereof, a horizontal surface 91a of the pressing plate 91, and a vertical surface 91b thereof.

The second bearing 87 has the same structure as the first bearing 85, and a description of the second bearing 87 will be omitted.

Figure 10:
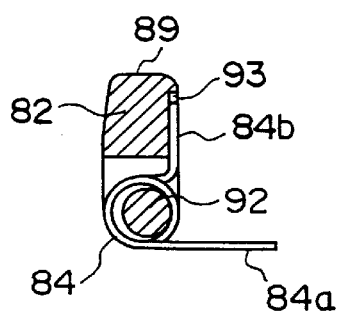
FIG. 10 is a sectional view that is taken along line B—B shown in FIG. 8 and illustrates an attachment of a torsion spring.

FIG. 10 is a sectional view taken along line B—B shown in FIG. 8. As shown in FIG. 10, the torsion spring 84 is wound around a shaft 92 of the protector 82. An end 84a of the torsion spring 84 presses the frame 14, and the other end 84b thereof is fit into a groove 93 formed in the side surface of the protector 82. Hence, the torsion spring 84 is urged in the counterclockwise direction (upright direction). Hence, the protector 82 is maintained, due to the spring force of the torsion spring 84, in the direction in which the disk cartridge sliding part 89 extends over the first shaft 86 and the second shaft 88.

Figure 11:
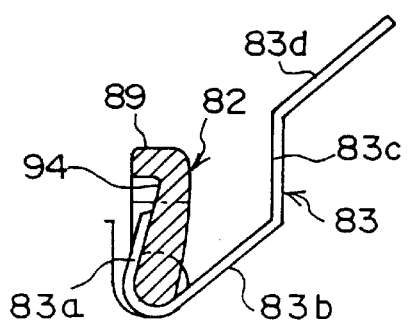
FIG. 11 is a sectional view that is taken along line C—C shown in FIG. 8 and illustrates an attachment of a protector arm.

FIG. 11 is a sectional view taken along line C—C shown in FIG. 8. As shown in FIG. 11, the protector arm 83 includes an engagement part 83a, a slope part 83b, a bent part 83c and a contact part 83d. The engagement part 83a is a U-shaped bent part so as to engage a recess part 94 provided in between the second shaft 88 and the attachment position of the torsion spring 84. The slope part 83b is inclined at an angle of about 45° with respect to the side of the protector 82. The bent part 83c is obtained by cranking the member at the end of the slope part 83b. The contact part 83d extends over the protector 82.

The contact part 83d is inclined at an angle β of about 45° with respect to the side of the protector 82 as in the case of the slope part 83*b*. Since the contact part 83*d* is inclined at 45° with respect to the direction in which the disk cartridge is inserted, the protector arm 83 can smoothly be rotated when it contacts the disk cartridge.

The contact part 83*d* contacts the lower surface of the disk cartridge during the process in which the disk holder 12 with the disk cartridge inserted therein is descended to the given loading position. As will be described later, when the disk cartridge comes into contact with the contact part 83*d* in the process of loading the disk holder 12, the contact part 83*d* is clockwise rotated so that the protector 82 is rotated in the limit releasing direction. The above rotation is caused because the contact part 83*d* is inclined in the rotating direction and the contact part 83*d* is inclined in the direction in which the disk cartridge is inserted.

A description will now be given of an operation of the disk cartridge contact preventing mechanism 81 carried out when the disk cartridge is inserted into the disk holder 12.

Figure 12:
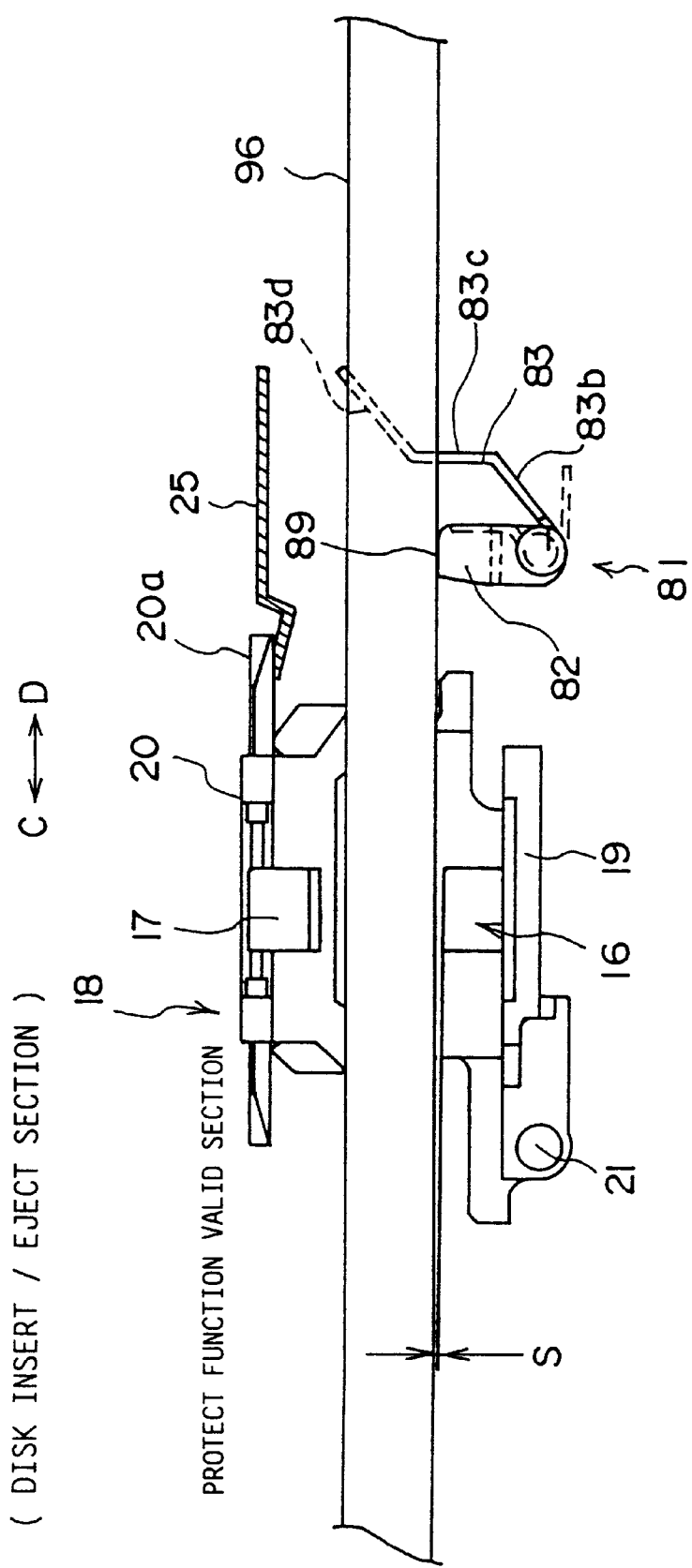
FIG. 12 is a front view illustrating a state in which the disk cartridge is inserted into the disk holder.
Figure 13:
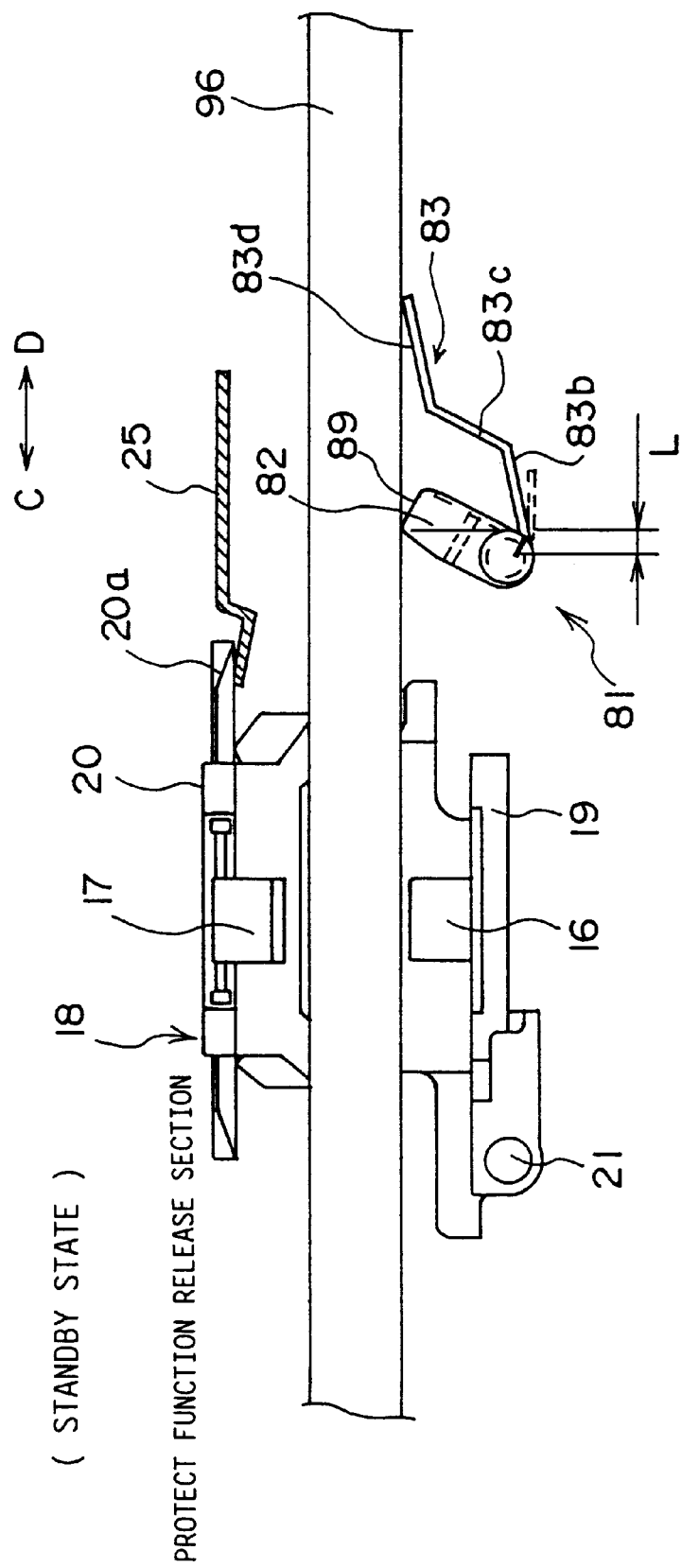
FIG. 13 is a front view showing a protect releasing operation.
Figure 14:
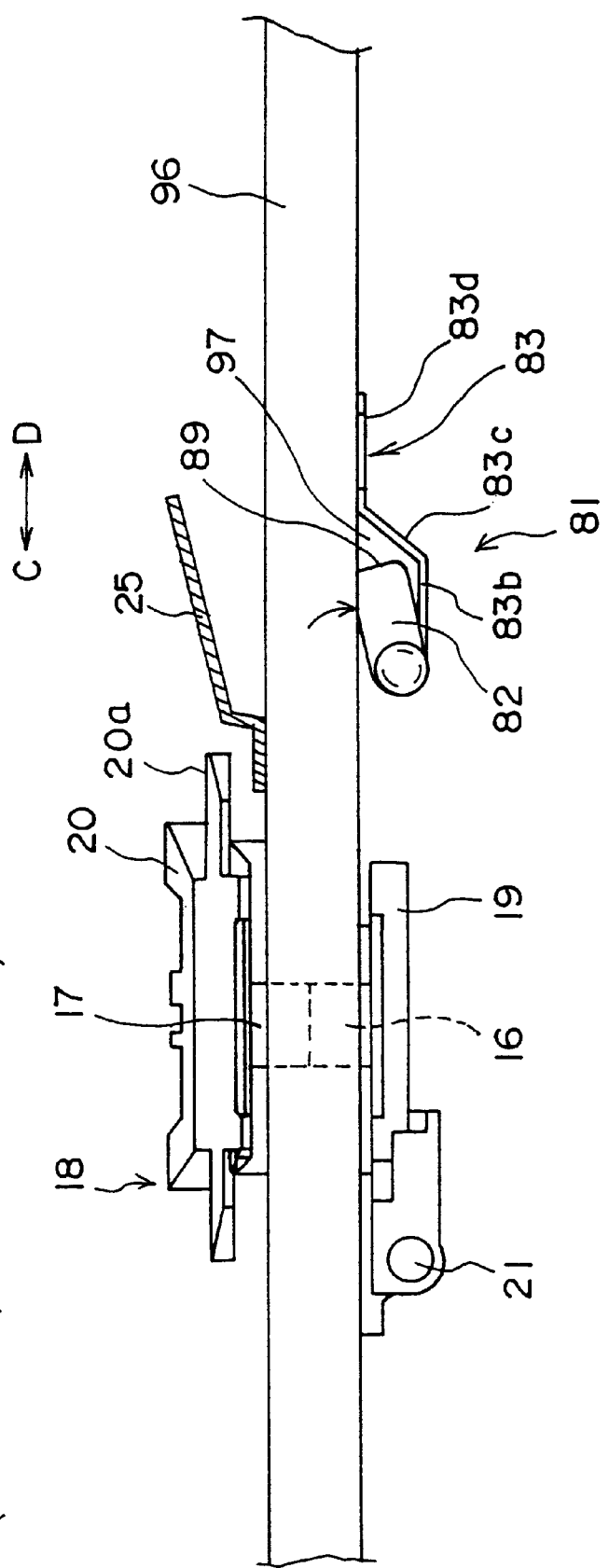
FIG. 14 is a front view illustrating an operation of the disk cartridge preventing mechanism in the recording/reproducing mode.

FIG. 12 shows a state in which the disk cartridge is inserted into the disk holder 12. FIG. 13 is a front view of the disk cartridge contact preventing mechanism 81 in which the protect releasing operation is illustrated. FIG. 14 is a front view of the mechanism 81 in which an operation thereof carried out when the magnetic recording/reproducing operation is carried out.

Referring to FIG. 12, when a disk cartridge 96 is inserted into the disk holder 12, the protector 82 is maintained in the state in which the cartridge sliding part 89 extends over the first shaft 86 and the second shaft 88 due to the spring force of the torsion spring 84. Hence, the lower surface of the disk cartridge 96 slides on the disk cartridge sliding part 89 so that the insertion height position of the disk cartridge 96 can be limited. That is, the disk cartridge sliding part 89 limits the insertion height position of the disk cartridge 96 so that the insertion height position and the lower magnetic head 16 define a gap S. Hence, the disk cartridge 96 passes over the lower magnetic head 16 so that the disk cartridge 96 is higher than the head surface of the lower magnetic head 16 by the gap S.

Hence, it is possible to prevent the leading end of the disk cartridge 96 in the cartridge inserting direction from hitting the lower magnetic head 16, which can be protected from any damage.

As shown in FIG. 13, when the disk cartridge 96 is further inserted in the direction B and the leading end thereof reaches the protect function releasing section, the disk cartridge 96 comes into contact with the contact part 83*d* of the protector arm 83. The contact part 83*d* of the protector arm 83 is offset from the shafts 86 and 88 of the protector 82 in the radial direction, and is thus pushed in the clockwise direction.

Hence, the protector 82 is rotated in the same direction as the protector arm 83, and the contact of the protector 82 with the lower surface of the disk cartridge 96 is deviated from the rotary axis by a length L. Hence, the disk cartridge 96 moves down while rotating in the clockwise direction.

As shown in FIG. 14, when the disk cartridge 96 inserted into the disk holder 12 moves down to the cartridge loading position, the contact part 83*d* of the protector arm 83 is depressed and simultaneously the disk cartridge sliding part 89 is depressed by the disk cartridge 96. Hence, the protector 82 is rotated clockwise.

Then, the disk cartridge 96 reaches the loading position, and the magnetic heads 16 and 17 come into contact with the magnetic disk (not shown) housed in the disk cartridge 96. Hence, information recording and reproducing can be carried out. When the protector arm 83 is rotated, the slope part 83*b* comes into contact with the frame 14 and is maintained in the horizontal state.

The protector arm 83 has the bent part 83*c* by cranking. Hence, a space 97 is defined between the disk cartridge 96 and the protector arm 83. The protector 82 is accommodated in the space 97, and is held in the limit releasing position in which the recording and reproducing operation is not affected by the protector 82.

It is possible to prevent the leading end of the disk cartridge 96 from hitting the lower magnetic head 16 without any mechanism for transferring a displacement of the slider 13. Thus, only a reduced area is needed to install the disk cartridge contact preventing mechanism 81. This is advantageous to increasing the capacity of the recording medium.

A description will now be given of mechanisms of the magnetic disk driver other than the disk cartridge contact preventing mechanism 81.

As shown in FIGS. 1 and 4, when the disk cartridge (not shown) is inserted into the disk holder 12 via the disk inlet 26 of the front vessel 27, the latch ever 38 is pressed and rotated clockwise. When the engagement part 38*b* of the latch lever 38 is spaced apart from the engaged part 13*h* of the slider 13, the slider urged by the coil spring 41 is caused to slide in the direction A. When the latch lever is rotated clockwise, the slider 13 is released from the engaged state, and the end 38*c* of the lever part 38*a* opens the shutter (not shown) of the disk cartridge.

The disk holder 12 is supported by the right and left side surfaces of the frame 14 so that it is allowed to move up and down. Thus, when the slider 13 slides in the direction A, the engagement pins 12*e* of the disk holder 12 are moved along the slant grooves 13*d*. Hence, the disk holder 12 is descended from the cartridge insert/eject position to the cartridge loading position.

Figure 15:
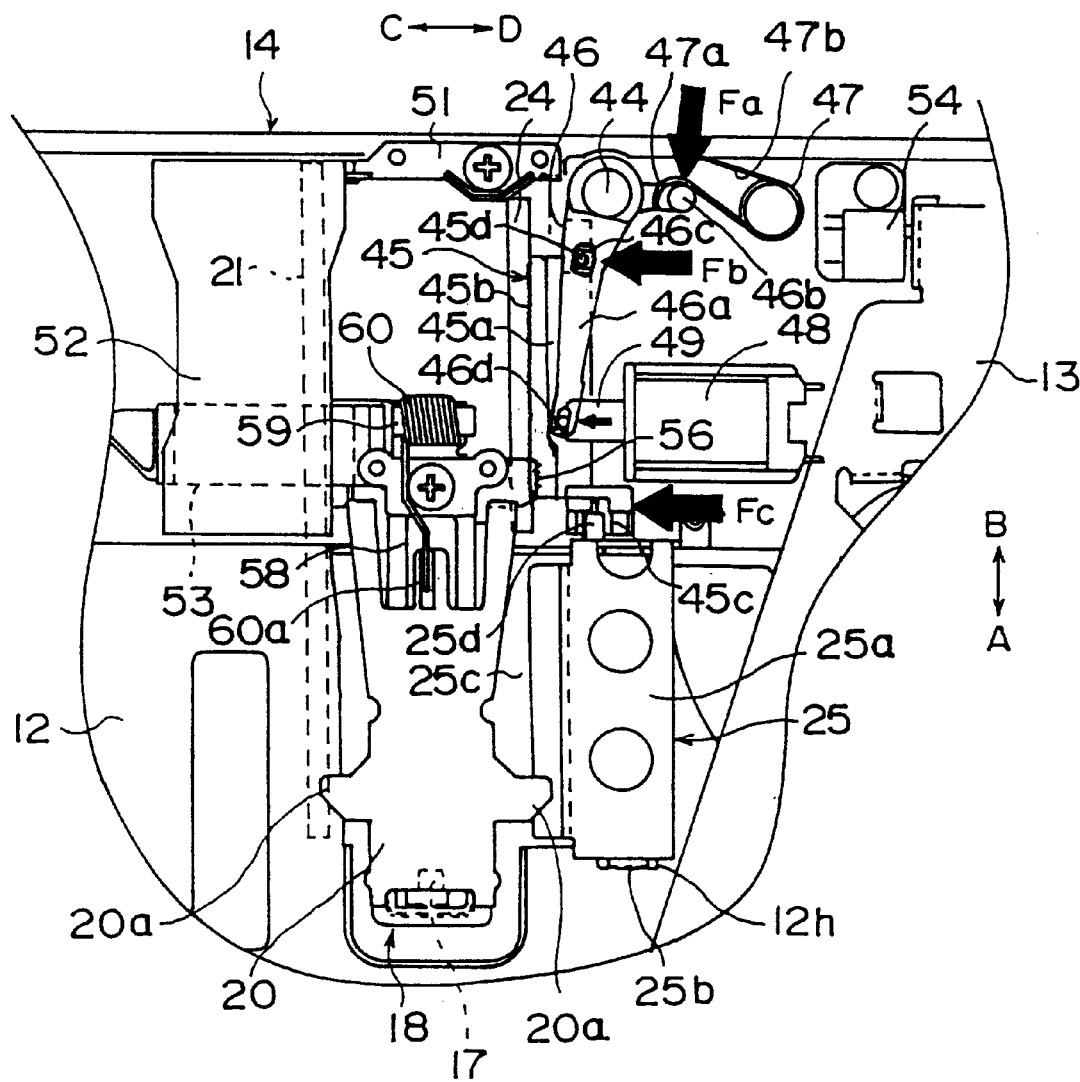
FIG. 15 is an enlarged plan view of a peripheral part of the head carriage observed in an eject mode.

FIG. 15 is an enlarged plan view of a peripheral part of the head carriage 18 observed in the eject mode. As shown in FIG. 15, in the eject mode, the end of the slider 13 extending in the direction B comes into contact with the eject detection switch 54, which is thus closed. In this state, the eject detection switch 54 outputs an eject detection signal to the control circuit (not shown). Hence, the solenoid 48 is demagnetized and displaces the plunger 49 in the direction C.

Also, in the eject mode, the solenoid 48 is not excited, the stopper joint lever 46 is rotated in the clockwise direction due to spring force Fa of the torsion spring 47. Hence, the carriage stopper 45 is rotated toward the head carriage 18, so that the rack 45*b* is engaged with the movable rack 56 related to the head carriage 18.

The spring force Fa of the torsion spring 47 serves as pressing force Fb which pushes the engagement pint 45*b* fit into the engagement hole 46*c* of the stopper joint lever 46 in the direction C.

The head carriage 18 can be driven in the directions A and B by the voice coil motor 52. If no driving force derived from the voice coil motor 52 is applied to the head carriage 18 due to service interruption or the like, the head carriage 18 is free to move without any regulation. However, in the eject mode, the rack 45*b* of the carriage stopper 45 engages the movable rack 56 so that the head carriage 18 is locked. Hence, the head carriage 18 can be prevented from being free to move.

If a service interruption occurs in any modes other than the eject mode, as in the case described above, no driving force of the voice coil motor 52 is generated and the solenoid 48 is demagnetized. Hence the head carriage 18 is locked and is prevented from being free to move.

Figure 16:
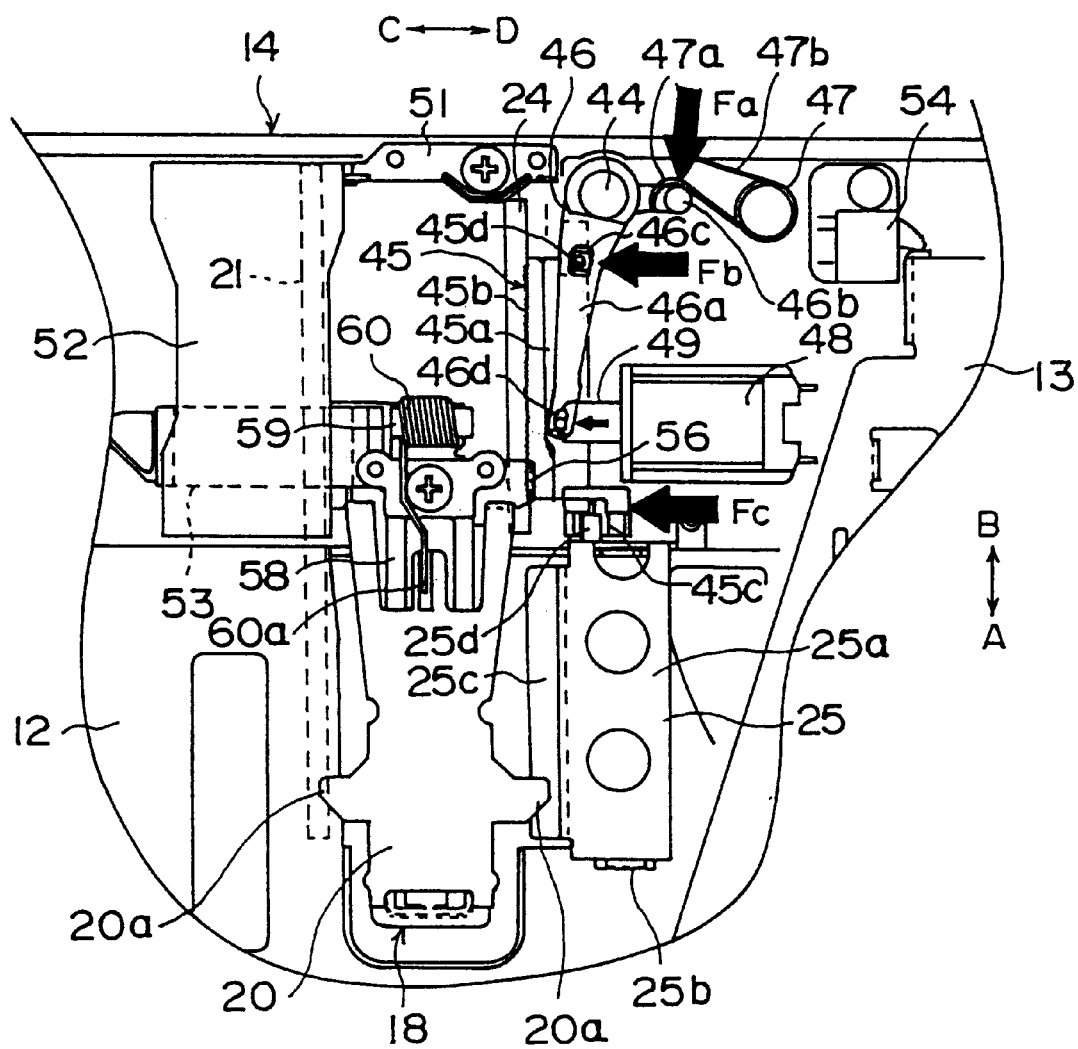
FIG. 16 is an enlarged plan view of the peripheral part of the head carriage observed in the recording/reproducing mode.

FIG. 16 is an enlarged plan view of a peripheral part of the head carriage 18 observed in the recording/reproducing mode.

As shown in FIG. 16, if the disk drive is in a standby state or a sleep state in the recording/reproducing mode, the seek operation on the head carriage 18 is not performed. Hence, the solenoid 48 is demagnetized. Thus, as in the eject mode shown in FIG. 6, the stopper joint lever 46 is rotated clockwise due to the spring force Fa of the torsion spring 47. Hence, the carriage stopper 45 is rotated toward the head carriage 18. Hence, the rack 45b of the carriage stopper 45 is engaged with the movable rack 56 provided on the side of the carriage 18. Hence, when the disk drive is in the standby state in the recording/reproducing mode, the head carriage 18 is inhibited from moving in the directions A and B.

A description will now be given of an operation of the head arm 20 which cooperates with the operations of the carriage stopper 45, the stopper joint lever 46, the torsion spring 47 and the solenoid 48.

Figure 17:
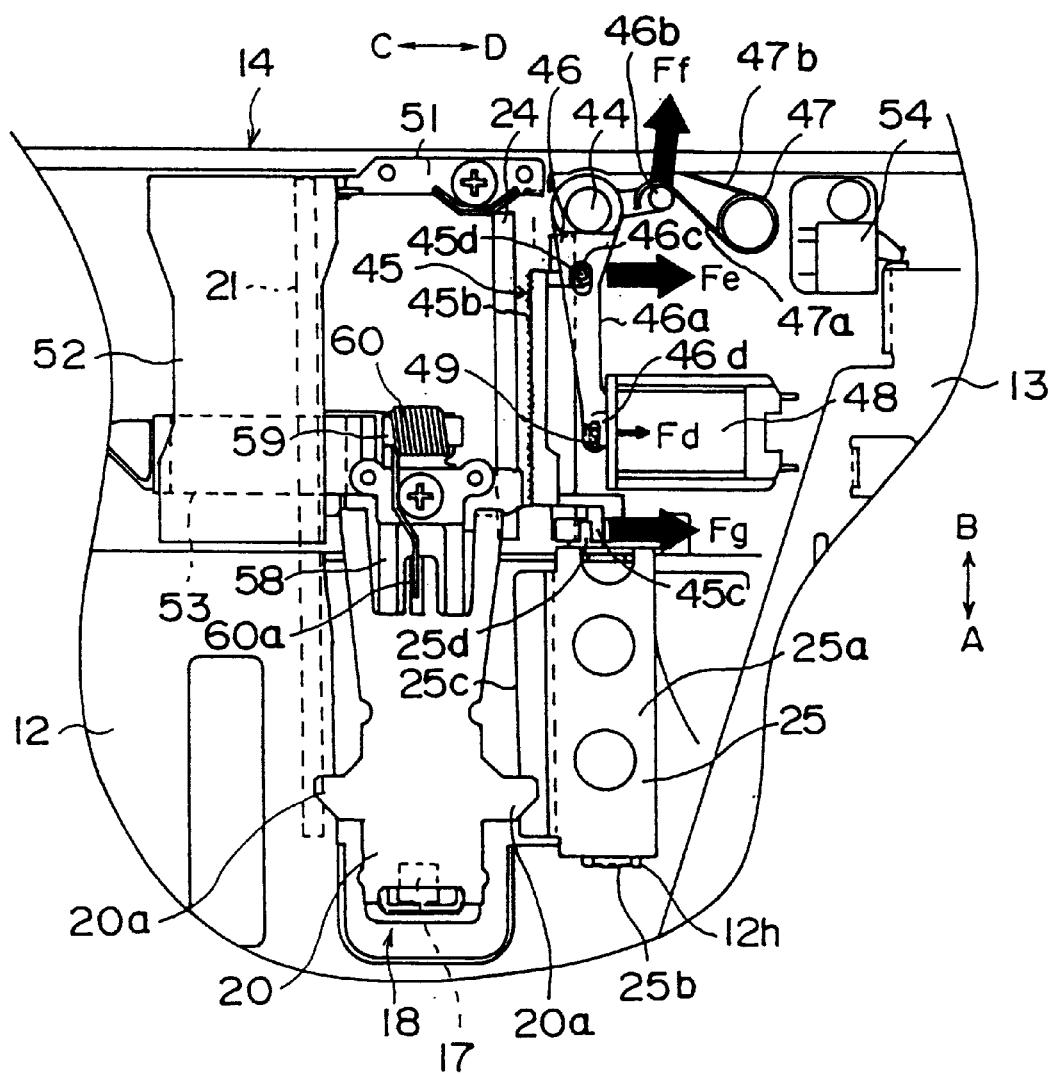
FIG. 17 is an enlarged plan view of the peripheral part of the head carriage observed when a seek operation is carried out in the recording/reproducing mode.

FIG. 17 is an enlarged plan view of a peripheral part of the head carriage 18 observed when the seek operation is performed in the recording/reproducing mode. As shown in FIG. 17, when the disk cartridge inserted into the disk holder 12 is moved to the recording/reproducing position in the recording/reproducing mode, a disk sensor (not shown) is turned on, and the solenoid 48 is excited after the disk motor (not shown) driving the turn table 15 reaches a given high-speed revolution. Hence, in the recording/reproducing mode, the solenoid 48 is excited and the plunger 49 is absorbed in the direction D. Hence, the stopper joint lever 46 joined to the plunger 49 is rotated counterclockwise, and thus the rack 45b of the carriage stopper 45 is detached from the movable rack 45c of the head carriage 18. Thus, the lock of the head carriage 18 by the carriage stopper 45 is released.

Hence, the head carriage 18 is moved in the radial directions (directions A and B) due to the driving force of the voice coil motor 52 (seek operation), and the magnetic heads 16 and 17 can be positioned on the desired tracks.

The plunger 49 absorbed in the direction D by exciting the solenoid 48 is engaged with the end 46d of the arm part 46a of the stopper joint lever 46. Hence, the absorbing force Fd of the solenoid 48 is boosted by the principles of the lever. Thus, boosted forces Fe and Ff are obtained which respectively press the projection pin 45d engaged with the engagement hole 46c located at the center of the arm part 46a and the torsion spring 47. The absorbing force Fd of the solenoid 48 functions as force Fg so that the V-shaped recess portion 45c of the carriage stopper 45 presses the engagement pin 25d of the lifter 25 in the direction D.

Hence, even if the absorbing force Fd of the solenoid 48 is small, it is boosted by the stopper joint lever 46 and is transferred to the carriage stopper 45 and the lifter 25. Hence, even if the solenoid 48 has only a small drivability, a sufficient driving force is available. Thus, it is possible to reduce power consumed in the solenoid 48 and to reduce the space for installation of the solenoid 48 and enable downsizing of the disk drive.

FIGS. 18A, 18B and 18C are front views of the head carriage 18 and the carriage stopper 45.

FIG. 18A shows a state observed in the eject mode. The stopper lever 46 is pushed in the direction C due to the spring force of the torsion spring 47. Hence, the carriage stopper 45 is rotated in the direction E due to the spring force of the torsion spring 47, and the rack 45b is engaged with the movable rack 56 of the head carriage 18. Hence, the head carriage 18 is locked to the carriage stopper 45.

FIG. 18B shows a state observed in the standby mode. As in the eject mode, the stopper joint lever 46 is pushed in the direction C due to the spring force of the torsion spring 47. Hence, the carriage stopper 45 is rotated in the direction E due to the spring force of the torsion spring 47, and the rack 45b is engaged with the movable rack 56 of the head carriage 18, which is thus locked.

FIG. 18C shows a state observed in the recording/reproducing mode. In this mode, as has been described previously, the solenoid 48 is excited and the topper joint lever 46 is driven in the direction D. Hence, the carriage stopper 45 is rotated in the direction F due to the driving force of the solenoid 48, and the rack 45b is detached from the movable rack 56 of the head carriage 18. Thus, the head carriage 18 is released from the locked state. Hence, the head carriage 18 is allowed to move in the directions A and B for the seek operation.

FIGS. 19A, 19B and 19C show operations of the carriage stopper 45 and the lifter 25 with respect to the head arm 20.

FIG. 19A shows a state observed in the eject mode. The carriage stopper 45 is rotated in the direction E due to the spring force of the torsion spring 47, and the rack 45b is engaged with the movable rack 56 of the head carriage 18. Since the disk holder 12 is ascended to the disk eject/insert position, the lifter 25 is also lifted.

An adjustment bolt 74 for adjusting the height position of the lifter 25 is screwed in a holding member 61. The lower end of the adjustment bolt 74 butts a contact part 75 extending from an end of the lifter 25. Hence, the magnitude of lifting of the lifter 25 can be adjusted by controlling the degree of screwing of the adjustment bolt 74.

In the process in which the disk holder 12 is ascended to the disk eject/insert position, the contact part 75 integrally provided to the lifter 25 butts the lower end of the adjustment bolt 74. The lifter 25 is supported so that it swings about the shaft 25b in the directions E and F on the disk holder 12. Hence, the contact part 75 extending rightward from the lifter 25 butts the lower end of the adjustment bolt 74 when the disk holder 12 is moving up. Hence, the lifter 25 is rotated in the direction F.

The engagement part 20a extending sideward from the head arm 20 engages with the engagement part 25c provided on the left side of the lifter 25. Hence, the lifter 25 is rotated in the direction F in response to the upward movement of the disk holder 12, and lifts the protruding part 20a of the head arm 20. Hence, the head arm 20 is retained so that the upper magnetic head 17 is spaced apart from the lower magnetic head 16. At that time, the engagement pin 25 is spaced apart from the V-shaped recess part 45c of the carriage stopper 45.

FIG. 19B shows a state observed in the standby mode. The head arm 20 is temporarily stopped between the disk eject/insert position and the disk loading position. That is, in response to the descending operation of the disk holder 12, the engagement pin 25d protruding from the end of the lifter 25 in the direction B enters into the V-shaped recess part 45c of the carriage stopper 45. The engagement pin 25d of the lifter 25 comes into contact with the slope parts of the V-shaped recess part 45c.

Hence, the lifter 25 is stopped in the intermediate position between the disk eject/insert position and the disk loading position. Hence, the rotating operation of the head arm 20 that cooperates with the lifter 25 is temporarily stopped.

In the standby mode, the head arm 20 is stopped in the intermediate position before it is moved down to the disk loading position. Hence, the upper magnetic head 17 supported by the tip end of the head arm 20 faces, through a given gap S, the lower magnetic head 16 supported by the end of the carriage 19. Hence, the upper magnetic head 17 is located above the magnetic disk (not shown).

The lower magnetic head 16 does not contact the magnetic disk until the disk holder 12 is moved down to the disk loading position. Then, the lower magnetic head 16 instantaneously contacts the magnetic disk when the disk holder 12 is further descended.

FIG. 19C shows a state observed in the recording/reproducing mode. As has been described previously, the solenoid 48 is excited and the stopper joint lever 46 is driven in the direction D in the recording/reproducing mode. Hence, the carriage stopper 45 is rotated in the direction F due to the driving force of the solenoid 48, and the rack 45b is detached from the movable rack 56 of the head carriage 18. Hence, the head carriage 18 is released from the locked state.

The carriage stopper 45 is rotated in the direction F, and thus the V-shaped recess part 45c of the carriage stopper 45 pushes the engagement pin 25d of the lifter 25 in the direction E. Hence, in cooperation with the rotation of the carriage stopper 45 in the direction F, the lifter 25 is rotated in the direction E and the engagement part 25c of the lifter 25 is descended.

Hence, the head arm 20 is moved down. Thus, the magnetic head 17 supported by the head arm 20 is stopped in a position close to the magnetic disk (not shown) in the standby mode, and then comes into contact with the magnetic disk so that the magnetic disk is sandwiched between the upper magnetic head 17 and the lower magnetic head 16.

In the above-mentioned manner, the magnetic head 17 is intermittently moved to the recording/reproducing position in which the magnetic head 17 is in contact with the magnetic disk. Hence, a shock to the magnetic disk that is rotating at high speed is relaxed and magnetic films formed on the surfaces of the magnetic disk can be protected from being damaged.

The eject operation is reverse to the above loading operation, and a description thereof will be omitted.

Figure 20:
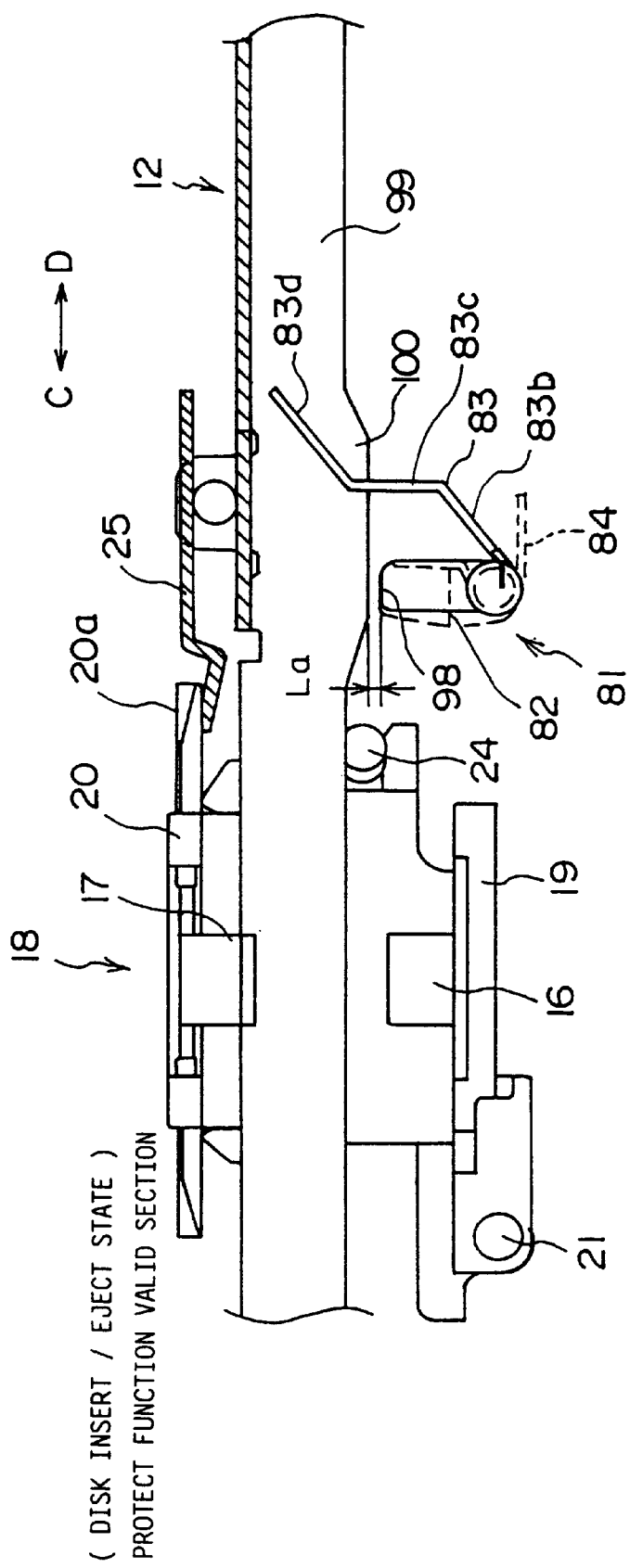
FIGS. 20, 21 and 22 are front views of a magnetic disk drive according to a second embodiment of the present invention.
Figure 21:
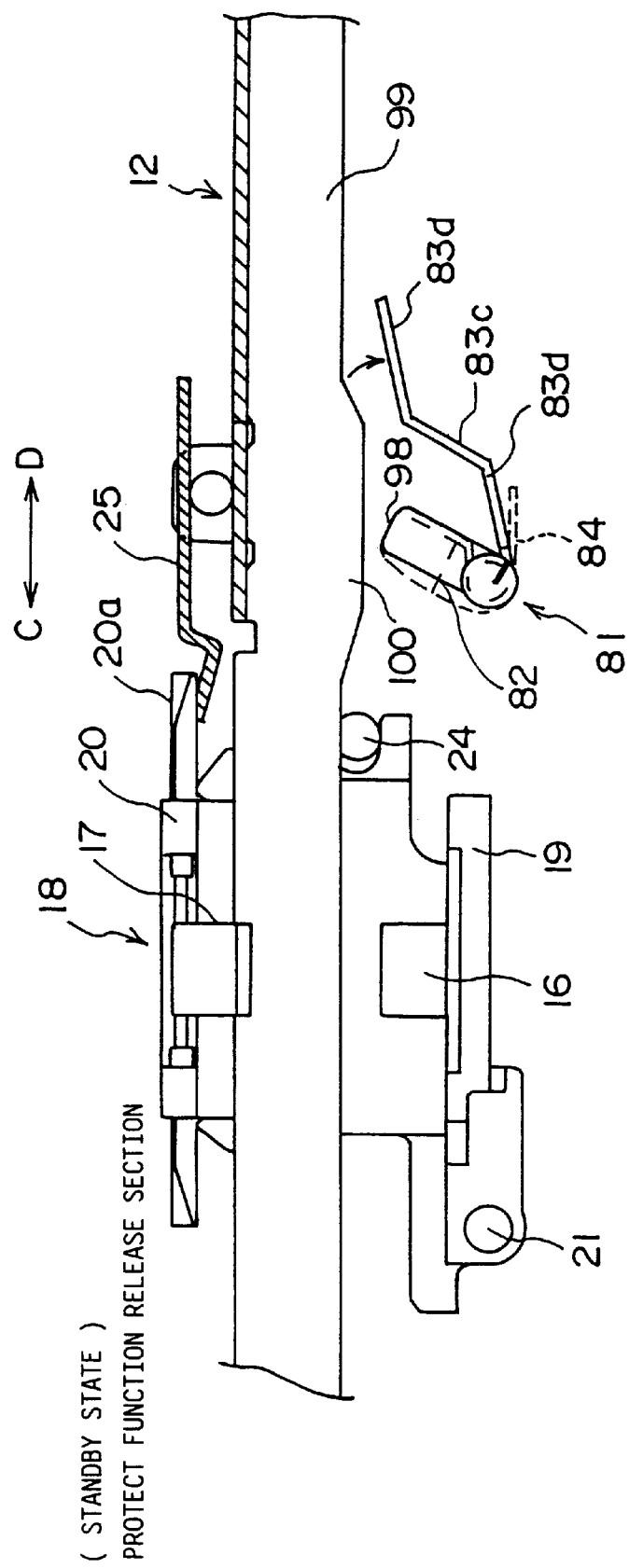
Figure 22:
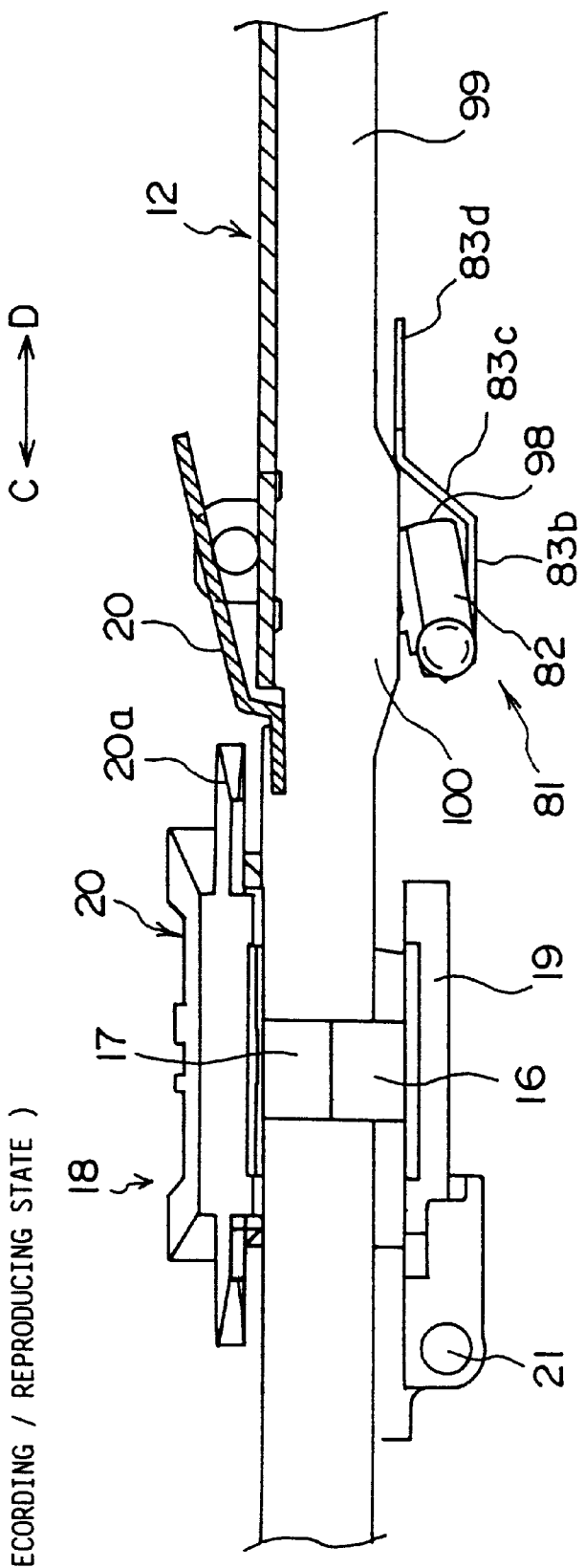

A description will now be given, with reference to FIGS. 20, 21 and 22, of a magnetic disk drive according to a second embodiment of the present invention, which is characterized in that it is equipped with a holder deformation preventing mechanism. In FIGS. 20–22, parts that are the same as those shown in the previously described figures are given the same reference numbers.

Referring to FIG. 20 showing the disk insert/eject state of the disk holder 12, the disk holder 12 has a beam 99, which is located at the rear portion thereof and extends in the directions C and D. The beam 99 can be formed by a bending of the plate that forms the disk holder 12. A protruding part 100 is formed in a lower portion of the beam 99, and extends downward. The protruding part 100 has a trapezoidal shape. The lower end of the protruding part 100 faces a holder contact part 98 of the protector 82 (see FIG. 6) and is spaced apart therefrom by a distance La. Hence, in the disk holder 12 before deformation, the protruding part 100 does not contact the holder contact part 98 of the protector 82.

If an excessive load is exerted on the disk holder 12 in, for example, a drop-resistant shock test or a similar test, the engagement pins 12e engage the slider 13 and a load is liable to concentrate on the intermediate portion of the beam 99 of the disk holder 12 which extends in the directions C and D.

If the intermediate portion of the beam 99 of the disk holder 12 is bent due to the excessive load exerted on the disk holder 12, the lower and of the protruding part 100 formed in the intermediate portion of the beam 99 comes into contact with the holder contact part 98 of the protector 82. At this time, the protector 82 is maintained in the upright state due to the spring force of the torsion spring 84, and can totally support the load applied to the disk holder 12.

Hence, the beam 99 of the disk holder 12 cannot be further deformed. With the above structure, it is possible to prevent deformation of the disk holder 12 without reinforcing the disk holder 12 itself and without reducing the thickness the disk holder 12. That is, the thickness of the disk holder 12 can remain the same without running the risk of deforming the holder. The beam 99 having the protruding part 100 formed in the intermediate portion thereof prevents such deformation.

FIGS. 21 and 22 respectively show the second embodiment of the present invention and correspond to FIGS. 13 and 14 related to the first embodiment thereof. As shown in FIG. 21, the holder contact part 98 is in the standby state, the protector 82 is pressed by the disk cartridge 96 (not shown) and is thus rotated in the clockwise direction. Even if the disk holder 12 starts to descend, the protruding part 100 of the disk holder 12 is maintained in the state in which the protruding part 100 does not contact the holder contact part 98 of the protector. Hence, the protruding part 100 is formed so that it does not interfere with the holder contact part 98 of the protector during the disk cartridge loading process. FIG. 22 shows the recording/reproducing state.

In the first and second embodiments of the present invention, the slider slides on the disk holder. However, the present invention includes an alternative arrangement in which the slider slides below the disk holder.

The first ands second embodiments of the present invention are the magnetic disk drives. However, the present invention is not limited to the magnetic disk drives, and include any types of recording medium driving apparatus such as an optical disk drive, a magneto-optic disk drive and a recording medium driving apparatus having a card-shaped cartridge such as a memory card.

What is claimed is:

1. A recording medium driving apparatus comprising:

a holder into which a cartridge having a recording medium is inserted;

a head part;

a cartridge contact preventing mechanism preventing an end of the cartridge from contacting the head part when the cartridge is inserted into the recording medium driving apparatus; and a deformation preventing mechanism having a first part for preventing deformation of the holder and a second part contacting the cartridge when the cartridge moves towards a disk loading position in the holder;

the first part of the deformation preventing mechanism being moved from a first position preventing deformation of the holder to a second position wherein deformation of the holder is not prevented by contact of the cartridge with the second part wherein:

the deformation preventing mechanism comprises a third part which contacts the cartridge part and prevents the head and the cartridge from contacting each other; and when the first part is moved from said first position to said second position, the third part is moved from the first position to the second position; and wherein the first, second and third parts of the deformation preventing mechanism are those of an integrally formed member.

2. The recording medium driving apparatus as claimed in claim 1, wherein the integrally formed member moves from said first position to said second position while rotating about a rotation axis.

3. The recording medium driving apparatus as claimed in claim 2, wherein the second part of the deformation preventing mechanism contacts the cartridge moving towards the disk loading position and is pushed against the cartridge so that the integrally formed member moves from said first position to said second position while rotating about the rotation axis.

4. The recording medium driving apparatus as claimed in claim 1, wherein the cartridge contact preventing mechanism comprises:

a first part which contacts the cartridge immediately before the cartridge reaches the head part to limit a height position of the cartridge so that the head part can be prevented from contacting the cartridge.

5. The recording medium driving apparatus as claimed in claim 4, further comprising:

in the given preventing mechanism which prevents the holder in an a deformation preventing mechanism which prevents the holder in a given insert/eject position from being deformed.

6. The recording medium driving apparatus as claimed in claim 4, wherein the cartridge contact preventing mechanism comprises:

a second part which moves the first part to a limit releasing position after the end of the cartridge passes the head part.

7. The recording medium driving apparatus as claimed in claim 6, wherein the second part contacts the cartridge after the end of the cartridge passes the head part.

8. The recording medium driving apparatus as claimed in 1, wherein:

the head part comprises two heads opposite each other; and the cartridge contact preventing mechanism has a part which defines a space between the cartridge and one of the two heads.

9. The recording medium driving apparatus as claimed in claim 8, further comprising:

the deformation preventing mechanism which prevents the holder an insert/eject position from being deformed.

* * * * *